US008425318B2

(12) United States Patent
Canterbury et al.

(10) Patent No.: US 8,425,318 B2
(45) Date of Patent: Apr. 23, 2013

(54) MULTIPLE WAGERING GAME DISPLAYS FROM SINGLE INPUT

(75) Inventors: Stephen A. Canterbury, Antioch, IL (US); Timothy C. Loose, Chicago, IL (US); Victor Mercado, Berwyn, IL (US); James M. Rasmussen, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 469 days.

(21) Appl. No.: 12/543,927

(22) Filed: Aug. 19, 2009

(65) Prior Publication Data

US 2010/0048288 A1 Feb. 25, 2010

Related U.S. Application Data

(60) Provisional application No. 61/090,791, filed on Aug. 21, 2008.

(51) Int. Cl.
*A63F 13/00* (2006.01)
*G09G 5/00* (2006.01)

(52) U.S. Cl.
USPC .................. 463/33; 463/31; 345/4; 345/619; 345/626

(58) Field of Classification Search .................... 463/16, 463/20, 31–34; 345/2.2, 4, 619, 626
See application file for complete search history.

(56) References Cited

U.S. PATENT DOCUMENTS

| | | | | |
|---|---|---|---|---|
| 4,448,419 | A | 5/1984 | Telnaes | |
| 5,130,794 | A * | 7/1992 | Ritchey | 348/39 |
| 5,152,529 | A * | 10/1992 | Okada | 463/20 |
| 6,262,694 | B1 * | 7/2001 | Ishimoto et al. | 345/1.1 |
| 6,517,433 | B2 | 2/2003 | Loose et al. | |
| 6,661,425 | B1 * | 12/2003 | Hiroaki | 345/629 |
| 7,160,187 | B2 | 1/2007 | Loose et al. | |
| 7,329,181 | B2 * | 2/2008 | Hoshino et al. | 463/20 |
| 7,488,252 | B2 * | 2/2009 | Griswold et al. | 463/31 |
| 7,753,773 | B2 * | 7/2010 | Baerlocher et al. | 463/20 |
| 7,841,944 | B2 * | 11/2010 | Wells | 463/37 |

(Continued)

FOREIGN PATENT DOCUMENTS

| | | |
|---|---|---|
| WO | WO-2007/005846 | 1/2007 |
| WO | WO-2007/030781 | 3/2007 |
| WO | WO-2008/005364 | 1/2008 |

OTHER PUBLICATIONS

U.S. Appl. No. 60/818,127, Durham, Timothy J., et al.

(Continued)

*Primary Examiner* — David L Lewis
*Assistant Examiner* — Robert Mosser
(74) *Attorney, Agent, or Firm* — DeLizio Gilliam, PLLC

(57) ABSTRACT

A wagering game system and its operations are described herein. In embodiments, the operations can determine different objects and/or portions within a wagering game video image and split the wagering game video image into multiple video streams containing different parts of the wagering game video image. The operations can then present the multiple video streams on multiple displays. The multiple displays can show the different parts of the wagering game video image appearing as separate and distinct video images. In some embodiments, some of the multiple displays can be placed in front of other displays. The operations can generate transparent masks that allow images to be seen through a display.

25 Claims, 13 Drawing Sheets

U.S. PATENT DOCUMENTS

| | | | | |
|---|---|---|---|---|
| 8,142,273 | B2 * | 3/2012 | Williams et al. | 463/20 |
| 8,192,281 | B2 * | 6/2012 | Williams et al. | 463/31 |
| 8,199,068 | B2 * | 6/2012 | Williams et al. | 345/6 |
| 8,210,922 | B2 * | 7/2012 | Williams et al. | 463/20 |
| 2002/0151360 | A1 | 10/2002 | Durham et al. | |
| 2003/0157980 | A1 | 8/2003 | Loose et al. | |
| 2004/0266515 | A1 | 12/2004 | Gauselmann | |
| 2005/0140088 | A1 | 6/2005 | Randall | |
| 2005/0255912 | A1 * | 11/2005 | Love et al. | 463/30 |
| 2006/0009286 | A1 | 1/2006 | Durham et al. | |
| 2006/0121972 | A1 * | 6/2006 | Walker et al. | 463/16 |
| 2006/0135248 | A1 | 6/2006 | Anderson et al. | |
| 2007/0004513 | A1 * | 1/2007 | Wells et al. | 463/31 |
| 2007/0010318 | A1 | 1/2007 | Rigsby et al. | |
| 2008/0004104 | A1 | 1/2008 | Durham et al. | |
| 2008/0113755 | A1 | 5/2008 | Rasmussen et al. | |
| 2008/0136741 | A1 * | 6/2008 | Williams et al. | 345/3.3 |

OTHER PUBLICATIONS

U.S. Appl. No. 60/876,917, Durham, Timothy J., et al.
U.S. Appl. No. 60/959,130, Thomas, Alfred.

* cited by examiner

MULTIPLE WAGERING GAME DISPLAYS FROM SINGLE INPUT

RELATED APPLICATIONS

This application claims the priority benefit of U.S. Provisional Application Ser. No. 61/090,791 filed Aug. 21, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

TECHNICAL FIELD

Embodiments of the inventive subject matter relate generally to wagering game systems, and more particularly to devices and processes of wagering game systems and networks that generate and control multiple wagering game images from a single wagering game video image.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Wagering game players are likely to be attracted to the most entertaining and exciting machines. Thus shrewd wagering game operators strive to employ the most entertaining and exciting machines, features, and enhancements available because such machines attract frequent play and hence increase profitability to the operator. As a result, wagering game manufacturers are continually thinking up new ideas that make wagering games increasingly more interesting. Some of those ideas include utilizing multiple displays (e.g., game monitors) on a wagering game machine. The multiple displays show a host of game graphics, message pop-ups, celebratory animations, game teasers, casino advertisements, etc. However, controlling so many graphics presents certain challenges. A wagering game processor can be stressed by having to control multiple sources of video data. Multiple graphics cards, excessive memory, and additional software may also be required to keep track of, and control, the video data presented on the multiple game displays.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Figure 1:
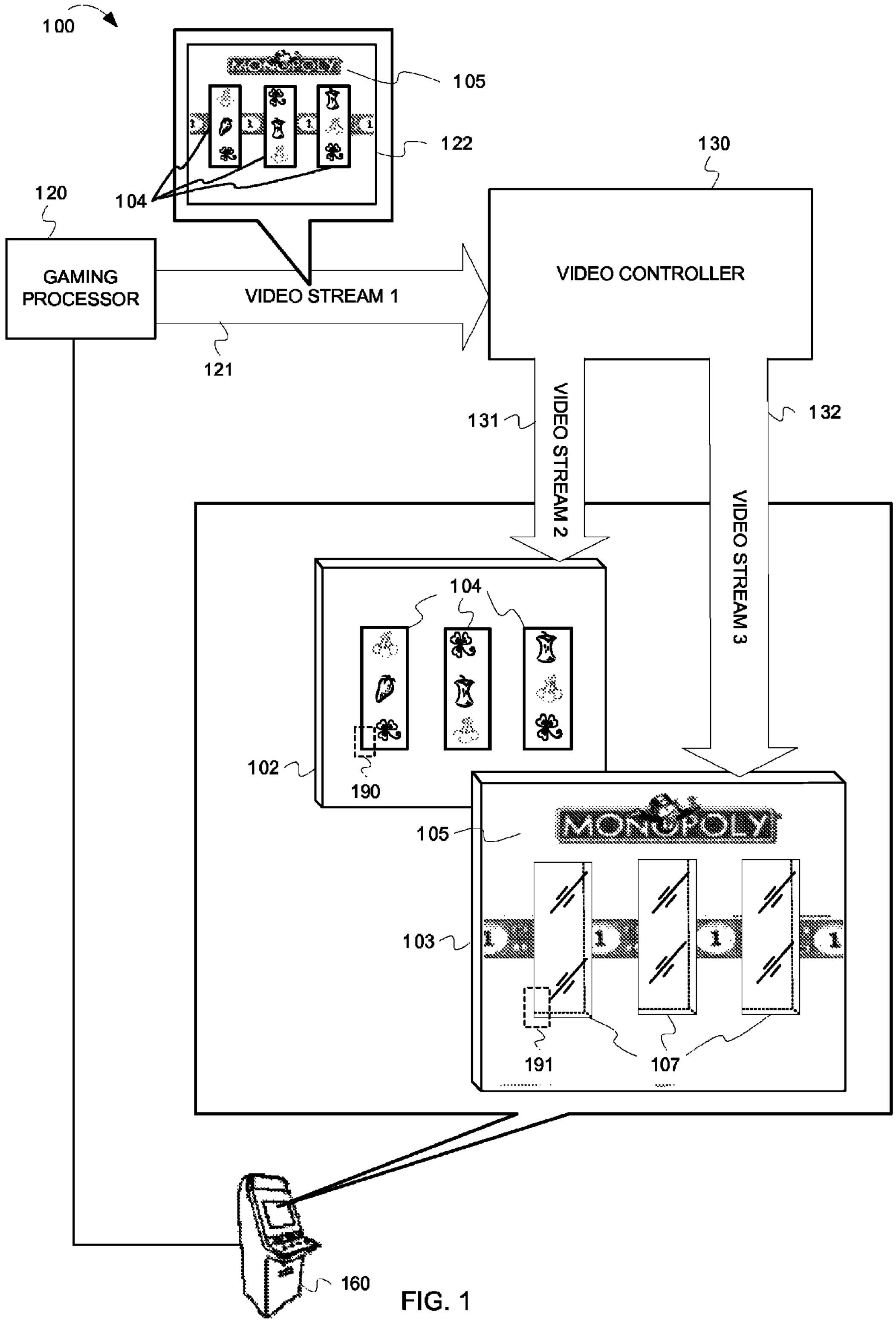
FIG. 1 is an illustration of a split video stream on multiple displays with masked portions, according to some embodiments.

As stated further above, wagering game manufacturers and operators face many challenges when developing wagering game machines that utilize multiple displays. Some of those challenges include trying to minimize the amount of wagering game machine resources needed to control video data. Embodiments of the inventive subject matter, however, illustrate examples of minimizing many of those challenges by generating multiple, different looking graphical presentations for multiple gaming displays, from a single video stream. FIG. 1, for example, illustrates an example of splitting a single video data stream into multiple data streams, where some of the elements of the single video data stream are included in the multiple, split data streams. A gaming processor can process data for a single wagering game video image. A video controller device can use masks to control (e.g., cover up, make transparent, etc.) certain portions of the wagering game video image within the split data streams so that the split data streams appear as different video images on multiple video displays.

FIG. 1 is a conceptual diagram that illustrates an example of a split video stream on multiple displays with masked portions, according to some embodiments. In FIG. 1, a wagering game system ("system") 100 includes a wagering game machine 160. The wagering game machine 160 includes a gaming processor 120, a video controller 130, a first display 102 and a second display 103. The displays 102 and 103 can be any kind of visual display devices, such as computer monitors, projection screens, televisions, etc. The gaming processor 120 generates a first video stream 121. The data in the first video stream 121 can include any digital, analog, or other video format (e.g., Digital Visual Interface (DVI), 3-D video, composite video, component video, etc.). The first video stream 121 produces a single game video image 122 at any point in time. The single game video image 122 can contain multiple parts that can be divided, or categorized, in different ways according to different embodiments. For example, the single game video image 122 can have a first set of game play images, or objects, (e.g., game play reels 104) and a second set of theme images or objects (e.g., the themed imagery 105 that surrounds the game play reels 104). The video controller 130 splits the first video stream 121 into two (or more) video streams (e.g., a second video stream 131, and a third video stream 132). The two split video streams 131 and 132 contain at least some of the data for the single game video image 122 in the first video stream 121. The video controller 130 determines what data from the first video stream 121 is included in the two split video streams 131 and 132. The video controller 130 sends the two split video streams 131 and 132 to multiple displays (e.g., the first display 102 and the second display 103). In one example, the video displays 102 and 103 can overlap in their alignment, according to a player's point of view. Consequently, the first display 102 may be referred to, contextually, as a "back", or "rear" display, whereas the second display 103 may be referred to as a "front" display. The video controller 130, however, can cause some of the video imagery that is displayed on some portions of the front display 103 to be fully or partially transparent, some of the time, so that a player can see through those portions on the front display 103 to the back display 102. In other words, when the video controller 130 presents one or more images (e.g., the game play reels 104) of the single game video image 122 on the back display 102, the video controller 130 can also present corresponding "masks" 107 on the front display 103. The corresponding masks 107 can be made to look transparent and can line up with the game play reels ("reels") 104 so that a player can see the reels 104 through the masks 107 (see FIG. 3 for further explanation which illustrates a blow-up of sections 190 and 191). At other times, however, the video controller 130 can make the corresponding masks 107 on the front display 103 appear non-transparent, by (1) displaying a live video display of the reels 104, (2) displaying a buffered, or frozen, display of the reels 104, (3) displaying something else that is not a part of the single game video image 122 (e.g., an "overlay" graphic selected by the video controller, an animation pulled from memory, a solid block of color, etc.), (4) displaying a combination of buffered images and overlay images (e.g., pay lines over the reels 104), (5) showing a distorted or expanded buffered image, etc.

"Masks" may refer to the "non-display" of a portion of the single game video image 122 on a display (e.g., the front display 103, or peripheral displays as described later in FIG. 5). However, although "mask" sometimes implies "covering" an image to prevent it from being shown/seen, some embodiments can actually make a mask appear transparent. Therefore, a "mask" can be either opaque, transparent, or some degree in between, based on the situation. Hence, in some embodiments, masks may be referred to herein as "transparent" masks, "windowed" masks, etc., if the video controller 130 is displaying transparent data on the masked portion(s) of a display. On the other hand, in some embodiments, the masked portions may be referred to as cover-ups, over-lays, buffered images, solid masks, etc., if the system is showing non-transparent images on the masked portions of a display.

In some embodiments, the splitting of the first video stream 121 eliminates a need to utilize multiple display graphics boards, excessive CPU processing, etc., to control multiple, different looking wagering game video images. For the most part, the imagery displayed on the two displays 102 and 103 can derive from the same single game video image 122, but look like distinctly separate video images.

Although FIG. 1 describes some embodiments, the following sections describe many other features and embodiments.

Example Operating Environments

This section describes example operating environments and networks and presents structural aspects of some embodiments. More specifically, this section includes discussion about wagering game systems and wagering game system architectures.

Wagering Game System Architecture

Figure 2:
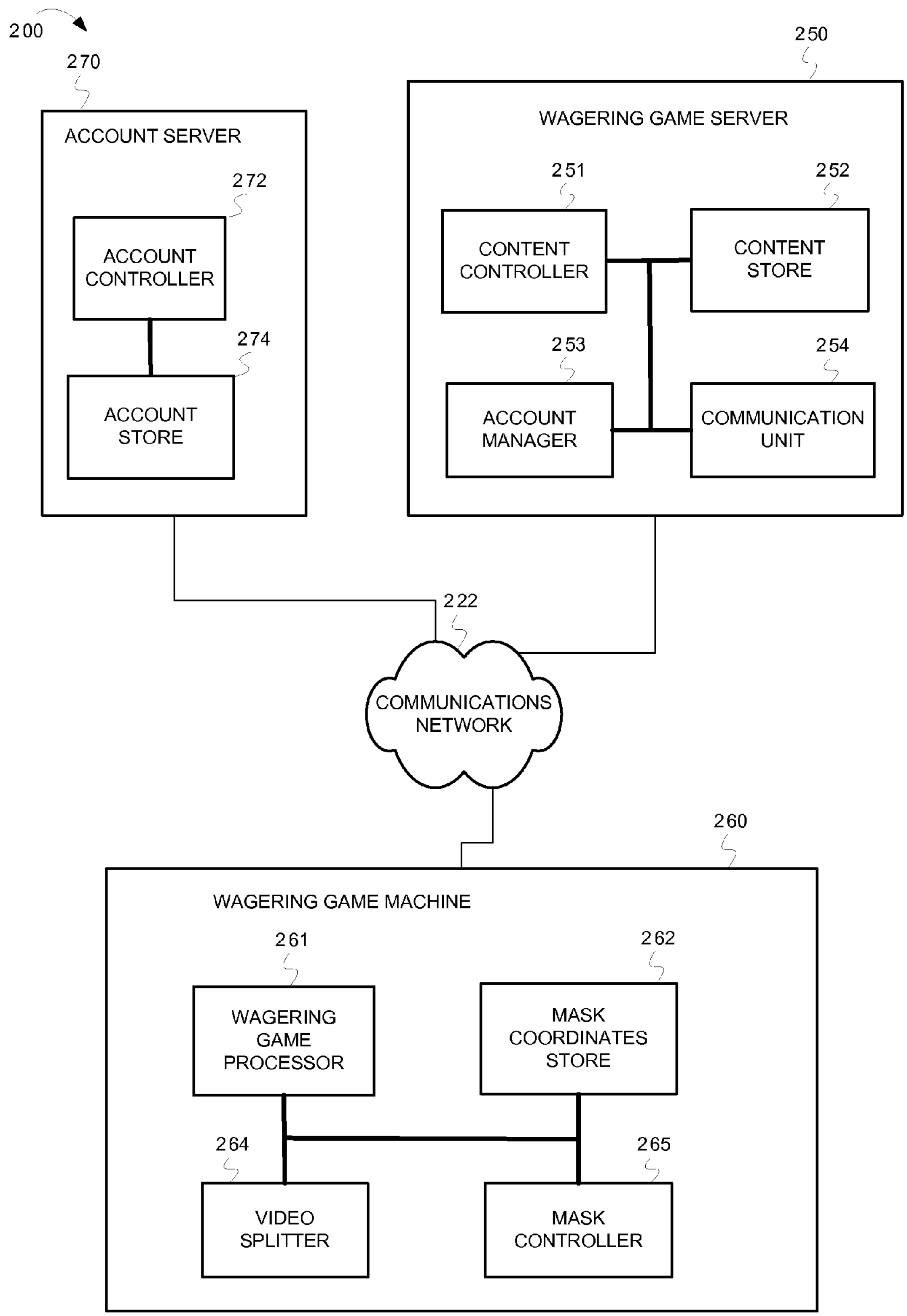
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers. The account server 270 can include an account controller 272 configured to control information for a player's account. The account server 270 also can include an account store 274 configured to store information for a player's account.

The wagering game system architecture 200 can also include a wagering game server 250 configured to control wagering game content and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 also can include a content store 252 configured to contain content to present on the wagering game machine 260. The wagering game server 250 also can include an account manager 253 configured to control information related to player accounts. For example, the account manager 253 can communicate wager amounts, game results amounts (e.g., win amounts), bonus game amounts, etc., to the account server 270. The wagering game server 250 also can include a communication unit 254 configured to communicate information to the wagering game machine 260 and to communicate with other systems, devices and networks.

The wagering game system architecture 200 also can include a wagering game machine 260 configured to present wagering games and receive and transmit information to generate and control multiple wagering game images from a single wagering game image using masks. The wagering game machine 260 can include a wagering game processor 261 configured to manage and control content and presentation of content on the wagering game machine 260. The wagering game processor 261 can generate a wagering game video image of a wagering game. The wagering game machine 260 also can include a mask coordinates store 262 configured to contain data (e.g., files, records, mask templates) that include coordinates for specific gaming objects within the wagering game video image (e.g., game play elements like slot reel images). The wagering game machine 260 also can include a video splitter 264 configured to split a data stream of the wagering game video image into two or more data streams. The split data streams include different images derived from the wagering game video image. The wagering game machine 260 also can include a mask controller 265 configured to position masks within split data streams. The mask controller 265 can also analyze a wagering game video image to determine the locations of specific objects that exist within the wagering game image, and then use the locations for masking. Some examples of masks and masking are illustrated in Figures above and below.

Each component shown in the wagering game system architecture 200 is shown as a separate and distinct element. However, some functions performed by one component could be performed by other components. For example, the wagering game server 250 may include a wagering game processor, a video splitter, a mask coordinates store, and/or a mask controller. The wagering game machine 260 could therefore function as a multi-display terminal, receiving split data streams and displaying them on multiple displays. Furthermore, the components shown may all be contained in one device, but some, or all, may be included in, or performed by multiple devices on the systems and networks 222, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

An Expanded View of Pixels on Multiple Displays

Figure 3:
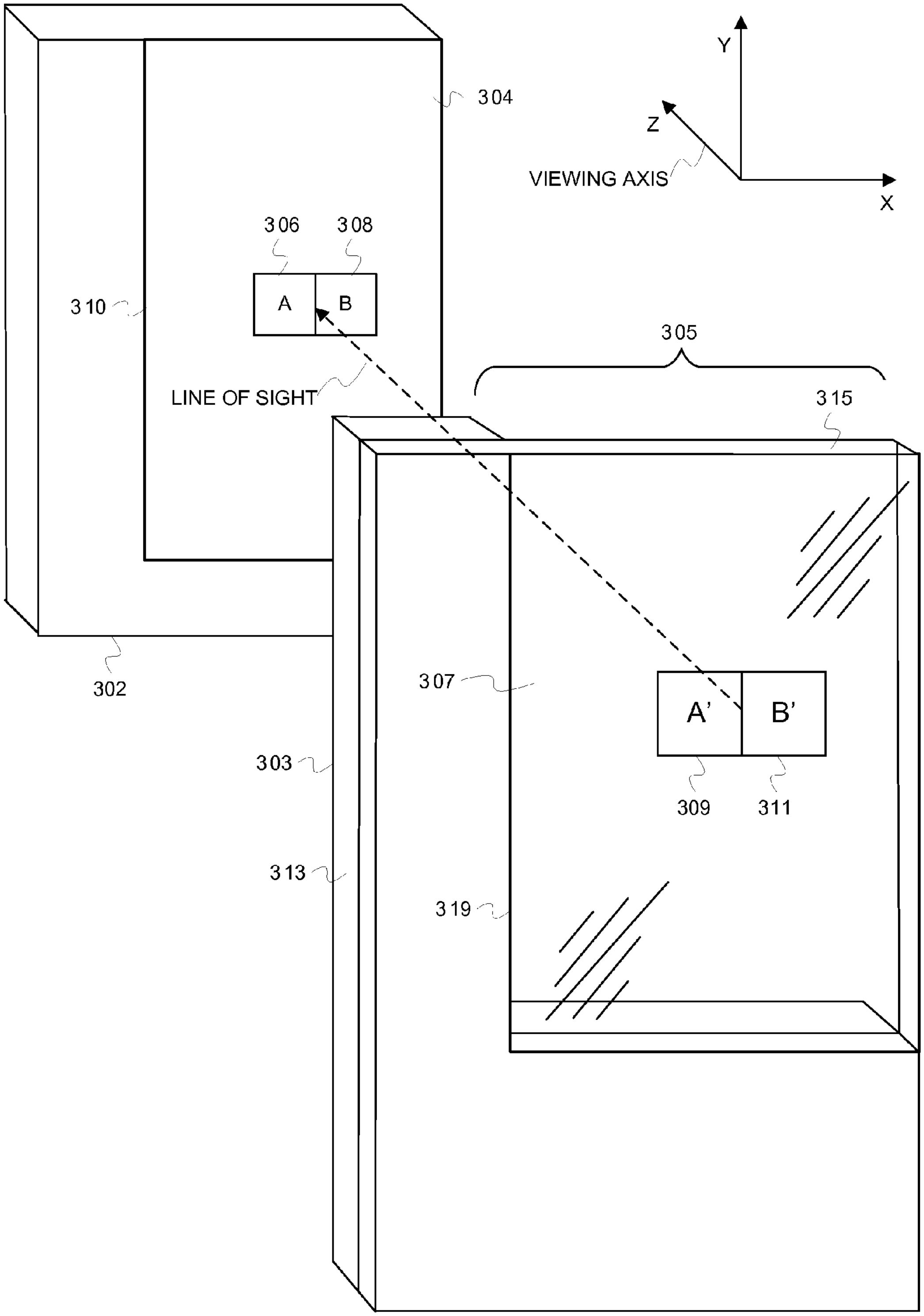
FIG. 3 is an illustration of masked pixels on multiple overlapping displays, according to some embodiments.
Figure 4:
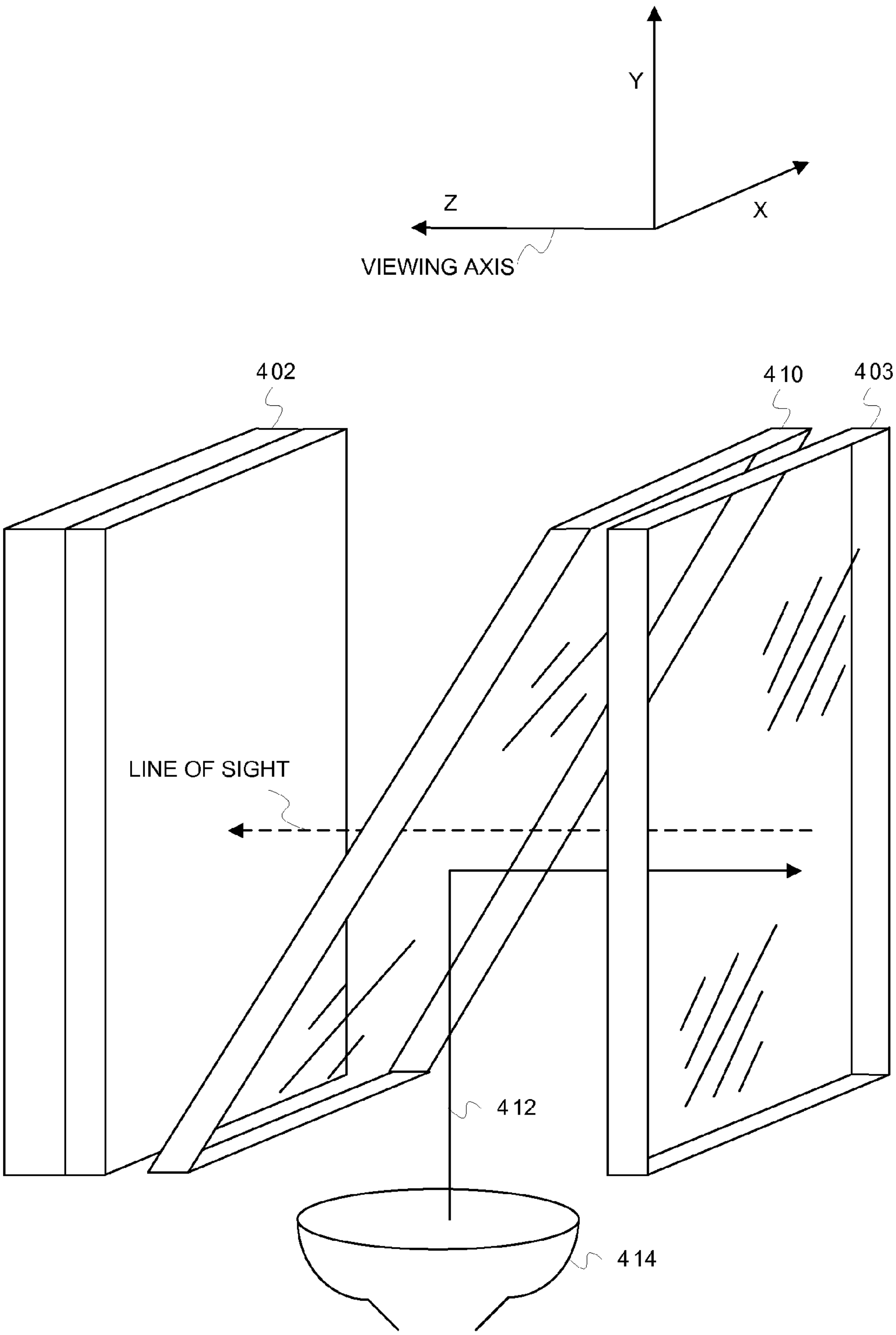
FIG. 4 is an illustration of an example video display according to some embodiments.

FIG. 3 is a conceptual diagram that illustrates an example of masked pixels on multiple overlapping displays, according to some embodiments. In FIG. 3, two video display sections 302 and 303 illustrate blown-up, cut-away illustrations of sections 190 and 191 of displays 102, 103 in FIG. 1. Video display section 302 may be referred to as a "rear" display 302, and video display section 303 may be referred to as a "front" display, where "front" and "rear" refer to their positions one in front of the other along a player's line of sight. The front display 303 includes see-through layers 315 that are either fully, or partially, see-through (e.g., transparent or partially transparent, clear, translucent, etc.) and opaque layers 313 that are non-see-through (e.g., solid, non-transparent, opaque, etc.). More specifically, the front display 303 includes one or more see-through layers 315 and one or more opaque layers 313. The opaque layers 313 may include materials that fully or significantly prevent, or reflect, the passage of light (e.g., hard plastics, reflective metallic materials, etc.). The see-through layers 315 may include materials that generate colors and light, but that are partially or fully transparent or translucent, or can be made to appear so. The see-through layers 315 may include a transparent back-lighting layer, glass, transparent plastic, transparent electrodes, liquid crystal, transparent color filters, and transparent light polarizers. The front display 303 may also include a transparent touchscreen mounted to the front surface to detect a player's touch during game operation. Because the material of the see-through layers 315 are see-through, the video controller 130, of FIG. 1, can create transparent and/or translucent portions (e.g., transparent masks) by generating the proper combination of color, contrast, or other visual characteristics, based on the video format or display material. For example, a white pixel on a liquid crystal display ("LCD"), with very little or no back-lighting (e.g., backlighting turned off, significantly reduced, blocked, or filtered), appears as a clear pixel that can be seen through when displayed using the see-through layers 315. In some embodiments, the front display 303 may be a cholesteric LCD device, an electrochromic device, a polymer dispersed liquid crystal device, a time multiplex optical shutter device, a plasma display panel ("PDP"), an organic LED ("OLED") devices, etc., all of which may have see-through layers. The rear display 302 may be any of the same kinds of video displays as the front display 303, but may also be other types of displays that may or may not include see-through layers, such as rear projection screens, television monitors, etc. In some embodiments, the front display 303 can include an angled glass layer positioned behind the front display 303 so that a projector can project light off the angled glass onto the front display 303 from the sides, top, or bottom of the front display 303. For instance, FIG. 4 illustrates an example embodiment of reflecting an image onto a clear protective window 403 and/or providing backlighting from an angle. A rear display 402, such as a flat display (e.g., LCD, PDP, OLED, etc.), is positioned behind the clear protective window 403 and a partially reflective mirror 410. The partially reflective mirror 410 can reflect light from one or more display devices (e.g., a second display device 414). The second display device 414 can be a video projector, a video monitor, etc. The second display device 414 can project light 412 off the partially reflective mirror 410 from below. The partially reflective mirror 410 reflects the light 412 along the viewing axis "Z", parallel with the line of sight, so that a player can view the reflected light 412 when standing in front of the clear protective window 403. In some embodiments, the partially reflective mirror 410 may only reflect a portion of the light 412 (e.g., allow 50% reflection of the light 412 to the player standing in front of the clear protective window 403 and 50% transmission of the light 412 upward). In some embodiments, the position of the second display device 414 and/or the angle of the partially reflective mirror 410, may change the appearance of the light 412 (e.g., more or less reflection) so that it is more or less transparent.

Returning to FIG. 3, the rear display 302 also includes part of a slot reel image ("reel image") 304. The reel image 304 includes at least two pixels, pixel A 306 and pixel B 308. Front display 303 includes a part of a transparent mask 307. The transparent mask 307 includes two pixels, pixel A' 309 and pixel B' 311. The transparent mask 307 is displayed using the electronic video elements (e.g., transparent electrodes, liquid crystal images, color filters, etc.) of the see-through layers 315 of the front display 303 (e.g., turning off the backlighting and generating a white color). The transparent mask 307 can also be made non-transparent (e.g., translucent, semitransparent, etc.) by changing the backlighting values, the color values, the contrast, and other image characteristics. In some embodiments, the transparent mask 307 can also be made opaque, for example, by placing a mechanical shutter behind the transparent mask 307 that closes, or by other means (e.g., by mechanically shifting the angle of a polarized glass screen), thus blocking the light from the rear display 302. A portion of the opaque layers 313 has been removed to create an aperture 305, or hole, within the opaque layers 313 of the front display 303. The see-through layers 315 of the front display 303, however, remain over the aperture 305. Because the transparent masks 307 are clear, a player can see through the aperture 305 to the rear display 302. The displays 302, 303 are aligned so that the horizontal and vertical edges of the displays 302, 303 share a common horizontal axis ("X") and a common vertical axis ("Y"). A third axis, the viewing axis ("Z"), is perpendicular to the horizontal axis and the vertical axis (e.g., perpendicular to the front of the displays 302 and 303). The viewing axis ("Z") is the axis along which a player views the wagering game imagery. Because the displays 302, 303 are aligned, a player can see the transparent mask 307 superimposed over the reel image 304. In other words, a mask border 319 of the transparent mask 307 is aligned with border 310 of the reel image 304 so that the reel image 304 can be seen through the aperture 305. The video controller 130 can determine the locations of the transparent mask 307 and the reel image 304 on the displays 302, 303, as well as the resolution of each of the displays 302, 303, the distance between the displays 302, 303, and any other information concerning the orientation, display properties, aspect ratios, etc. of the displays 302, 303. The video controller 130 of FIG. 1, therefore, can display pixel A 306 and the corresponding pixel A' 309 as overlapping pixels. Because the rear display 302 is behind the front display 303, the reel image 304 has an appearance of depth when viewed through the aperture 305 of the front display 303. This description includes a further explanation of how pixels 306, 309, 308 and 311, can be controlled as varying dynamic and static pixels. However, that explanation is more meaningful after reading through several of the subsequent Figures. Consequently, that explanation can be found after FIG. 11.

A Split Video Stream Wagering Game System

Figure 5:
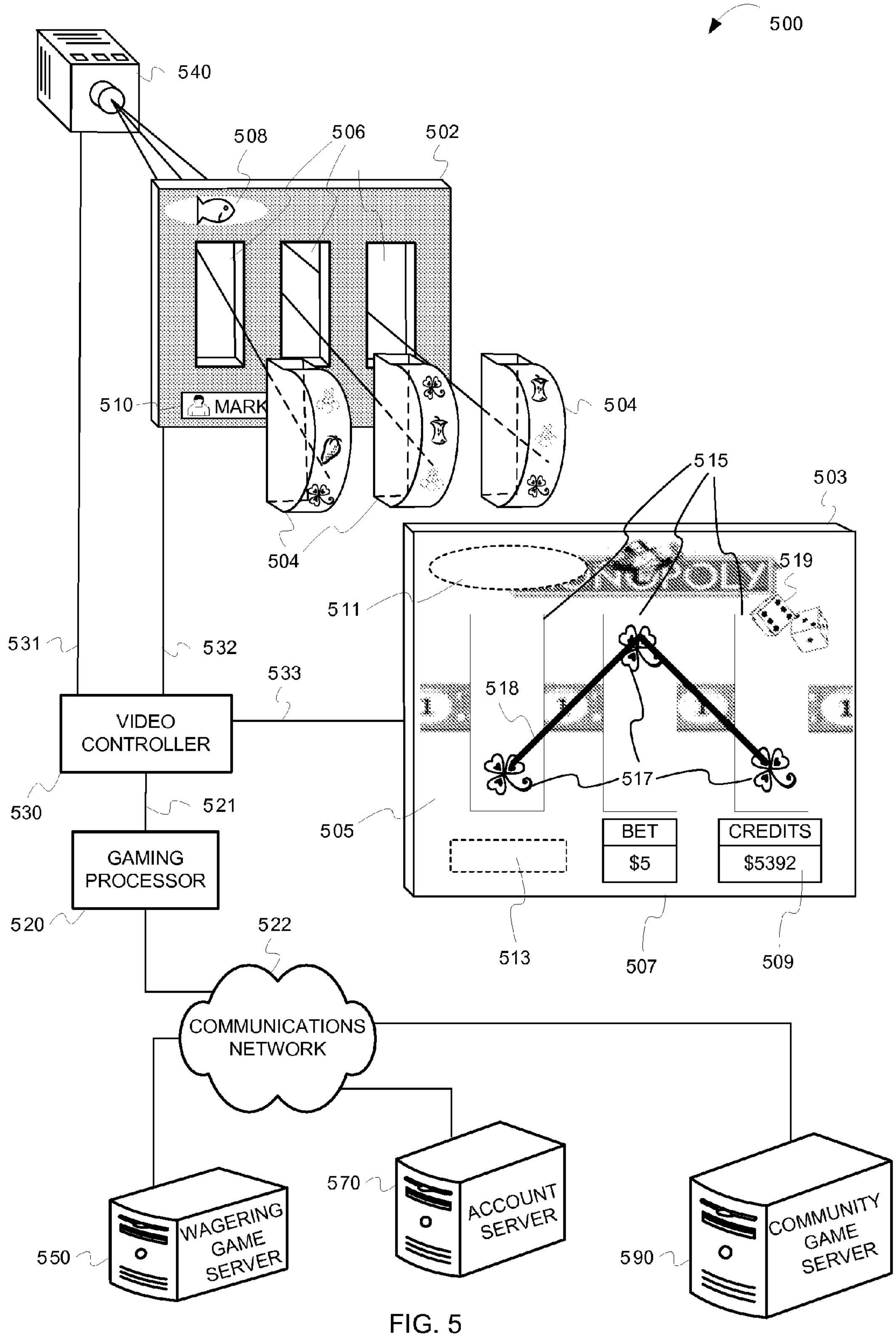
FIG. 5 is an illustration of a split video stream wagering game system 300, according to some embodiments.

FIG. 5 is a conceptual diagram that illustrates an example of a split video stream wagering game system 500, according to some embodiments. In FIG. 5, the split video stream wagering game system ("system") 500 includes a wagering game server 550, an account server 570, and a community game server 590 (e.g. a progressive server), connected to a communications network 522. A gaming processor 520 is also connected to the communications network 522. A video controller 530 is connected to the gaming processor 520. The gaming processor 520 and the video controller 530 can be a part of, or connected to, a wagering game machine, such as a standing model wagering game machine, that includes a rear-projection unit ("projector 540"), and multiple displays, such as a background ("back") display 502, a foreground ("front") display 503, and one or more middle display devices ("displays 504"). The video controller 530 can split a first video stream 521, containing a single wagering game video image, into multiple "split" data streams 531, 532, 533. Each of the split data streams 531, 532, 533 can contain some portion of the wagering game video image contained within the first video stream 521, similar to described previously in FIG. 1. The first split data stream 531 includes images of game elements, such as slot reel images. The projector 540 receives the first split data stream 531 and projects the images of slot reels on separate displays 504 for each reel. The separate displays 504 can have curved surfaces on front with a radius of curvature comparable to a reel strip mounted to a mechanical reel. The displays 504 can be hollow in the back. The curved fronts can be made of transparent, or semi-transparent, material that captures the reel images from behind and displays the projected image on the front of the displays 504. The projector 540 can project the reel images, via air, through openings 506, or apertures, that have been formed in the back display 502 so that the back display 502 can function. For example, the openings 506 can be formed by making the openings in the material of the back display 502 and connecting video control lines along the edges of the openings 506 so that the back display 502 can address video rows and columns. In other embodiments, the projector 540 can be in front of the back display 502, but behind the displays 504 (e.g., a small projector inside each of the displays 504), so that the back display 502 would not need the openings 506 formed into it. In some embodiments, the displays 504 can appear to rotate similar to mechanical reels by using a rotating screen attached to a stationary frame. In other embodiments, the projector 540 can be in front of the displays 504 and project the reel images from the front. The system 500 can utilize different types of projectors and/or methods of projecting the images onto the displays 504, including projection using fiber optics, reflections on mirrors, etc. In other embodiments, however, the separate displays 504 may be stand-alone display devices (e.g., liquid crystal displays) instead of projection screen displays.

The video controller 530 sends a second split data stream 532 to the back display 502 and a third split data stream 533 to the front display 503. The video controller 530 can mask the images of the game elements from the second split data stream 532 and the third split data stream 533, and include images of other objects (e.g., wagering game theme imagery ("theme imagery") 505, masks 511, 513, background animations, player information, etc). The second split data stream 532 and third split data stream 533 can include data from network devices, such as from the community game server 590, the account server 570 and/or the wagering game server 550. For instance, the video controller 530 can include in the second split data stream 532 an image of a swimming fish ("fish") 508, that, when displayed, moves around the back display 502. The video controller 530 can generate and control the fish 508 based on information that may be secondary to (e.g., not directly related to) the main wagering game. For example, the fish 508 can appear periodically and lurk in the background to remind the player of one or more long-standing community games that are in progress, to advertise new games that are available to play, to advertise casino events, to provide social messages to the player, etc. The video controller 530 can also receive player account information 510 from a player account hosted by the account server 570 and include the player account information 510 in the second split data stream 532. The back display 502 displays the player account information 510.

The video controller 530 can include mask data in the third split data stream 533 so that the front display 503 can display masks 511, 513, and 515. The front display 503 has a large portion of its back plating removed (i.e., opaque layers such as non-transparent metals, plastics, etc. have been removed, though not the transparent layers that generate color pixels and/or lighting, see FIG. 3). In some embodiments, the front display 503 and the rear display 502 may share a common backlighting behind the rear display 502. Because the front display 503 has the opaque layers removed, most of the front display 503 is see through so that the masks 511, 513 and 515 can be presented almost anywhere on the face of the front display 503 as transparent data so that objects on the back display 502 can be seen through the masks 511, 513 and 515. Mask 513 can be a transparent mask that permits the player account information 510 to be viewed through the front display 503. The mask 511 can also be a transparent mask that moves around the front display 503 as the fish 508 moves around the back display 502. In some embodiments, the masks 511, 513, and 515 can shift back and forth between the displays 502, 503. Masks 515 can be transparent masks, or non-transparent masks, at specific times during the wagering game. For example, in a slot game with reels images displayed on the displays 504, the masks 515 can generally be transparent to show reels behind the front display 503. Occasionally, however, the masks 515 can change to a solid color, a solid pattern, a buffered image (e.g., to capture a reel result and freeze it), or a live image (e.g., a celebratory animation), for brief periods. In other embodiments, however, based on other games, the masks 515 may generally be non-transparent and can be made transparent for brief periods during the wagering game, like in a game where the masks 515 represent doors, and the doors only open briefly to reveal a game result presented on the displays 504 (see FIG. 7 for example details).

In some embodiments, the video controller 530 can buffer, or store, one or more portions of a wagering game image, such as the game reels as they appear after they stop moving. The video controller 530 can display the buffered images on the masks 515 of the front display 503. In some embodiments, the video controller 530 shows only winning elements of the reel images, such as the winning shamrock icons 517 by placing opaque masks over the non-winning elements. The video controller 530 can also display animated items (e.g., pay lines 518, bonus objects 519, celebratory images, etc.), on the buffered images in masks 515 and across the theme imagery 505 of the front display 503. In some embodiments, the video controller 530 can select the animated items from a memory storage (e.g., from the wagering game server 550). In other embodiments, however, the animated items can be part of the wagering game video image within the first video stream 521. In some embodiments, the system 500 could include another display layer (not shown) in front of the front display 503. The floating layer could display the animated items.

The images appearing on the back display 502 give the visual effect of depth as they are seen through the front display 503 adding to the gaming experience. In some embodiments, the displays 504 and front display 503 may be reversed in positions (e.g., displays 504 in front of the front display 503 to make the reels appear to be floating above a background instead of sunken behind a foreground). In addition to producing a visual depth effect, the back display 502 can function as a secondary display for displaying information that is secondary in importance to the main wagering game. The secondary information can be helpful to see, but not especially important to the wagering game as the game play progresses. The important game imagery (e.g., theme imagery 505, pay lines 518, a bet meter 507, a credit meter 509, etc.), however, can appear on the front display 503.

It should be noted that while the masks 515 shown in this example are all rectangular (for reels), they could be of any shape, like the oval mask 511, or any number based on the game play elements of a wagering game. In some embodiments, the system 500 can utilize multiple small masks to create visual effects. For instance, the video controller 530 may include mask data within the first split data stream 531 which causes a grainy or worn look to the reel images when projected on the displays 504. Furthermore, the system 500 may also include additional displays in front of, in back of, or peripheral to any of the displays 502, 503 and displays 504. Some video manipulation might be required to rotate and/or size the video sent to the front and back displays 502, 503 based on the orientation, resolution, and other characteristics of the displays 502, 503. Some embodiments, however, may utilize displays that have the same resolution, as described in FIGS. 8 and 9. Further, the system 500 can manage the lighting on the displays 504 and displays 502, 503, to compensate for light attenuation that occurs by viewing a display through another display.

A Split Video Stream Wagering Game System with Non-Overlapping Displays

Figure 6:
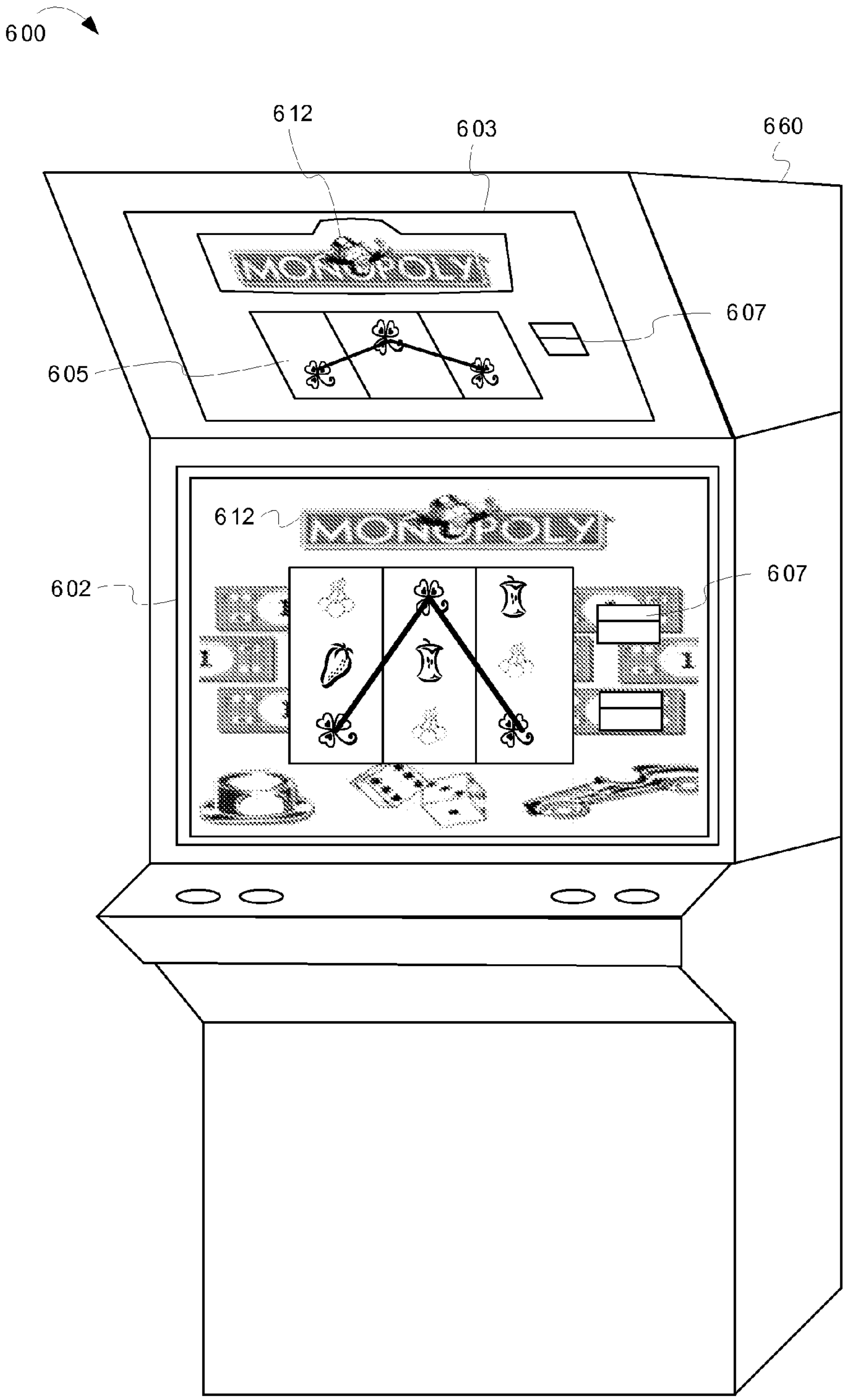
FIG. 6 is an illustration of a split video stream wagering game system 600 with non-overlapping displays, according to some embodiments.

FIG. 6 is a conceptual diagram that illustrates an example of a split video stream wagering game system ("system") 600 with non-overlapping displays, according to some embodiments. In FIG. 6, a wagering game machine 660 includes multiple displays 602, 603 that are non-overlapping (e.g., adjacent to each other, not superimposed, not overlaid to be in front of or behind each other), like in FIGS. 1, 3, 4 and 5. However, although the non-overlapping displays 602, 603 are not overlapping, the general concepts described in FIGS. 1, 3, 4 and 5 can still be applied. In other words, a video controller can split video data from a first data stream into multiple data streams containing different information. The video controller can then present data from the multiple data streams on the displays 602, 603. In FIG. 6, the display 603 may be called the "top" display 603 and the display 602 may be called the "bottom" display 602, because they are above and below each other. In other embodiments, however, the displays 602, 603, may be side to side or some other configuration. The top display 603 may be smaller than the bottom display 602, or vice versa, or both displays 602, 603 may be the same size and/or resolution. If the top display 603 is smaller than the bottom display 602, the system 600 can adjust the masking positions for the top display 603 because of its smaller size. In some embodiments, the smaller top display 603 may be used to present secondary information, such as buffered portions of the bottom display 602 (e.g., logo 612, player information, etc.). For example, a boot up video image of the wagering game may include the logo 612, branding, and/or other consistent information, for the wagering game, which the top display 603 can hold buffered and displayed on parts of the top display 603 throughout a wagering game session. The other parts of the top display 603 can change periodically throughout the wagering game using the split data streams and masks. As a result, neither the top display 603 nor the bottom display 602 need to be preconfigured with branding or specialized images. This can make the wagering game machine 660 more modular, permitting wagering game themes to be entirely interchangeable on the displays 602, 603, while generating the imagery from a single game video image.

In some embodiments, the top display 603 can selectively display some images from the bottom display 602 by blocking some of the wagering game images with opaque masks and showing only some of the wagering game video image, at certain times. For example, the top display 603 can show a frozen image 605 of the last wagering game win, a "pay" meter 607, a celebratory animation, etc. That way, the top display can act as an advertisement to passing casino patrons so that they can see the positive elements of the game. The game imagery displayed in the top display 603 can also have a reciprocal relationship to corresponding portions displayed in the bottom display 602. For example, the bottom display 602 may show dynamic video, in some places of the bottom display 602, while the top display 603 shows static images in the corresponding places of the top display 603. Further, the top display 603 and bottom display 602 can also have other displays behind them, as shown in FIGS. 1, 3, 4, and 5, to create the appearance of depth, to display secondary information, etc.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 7:
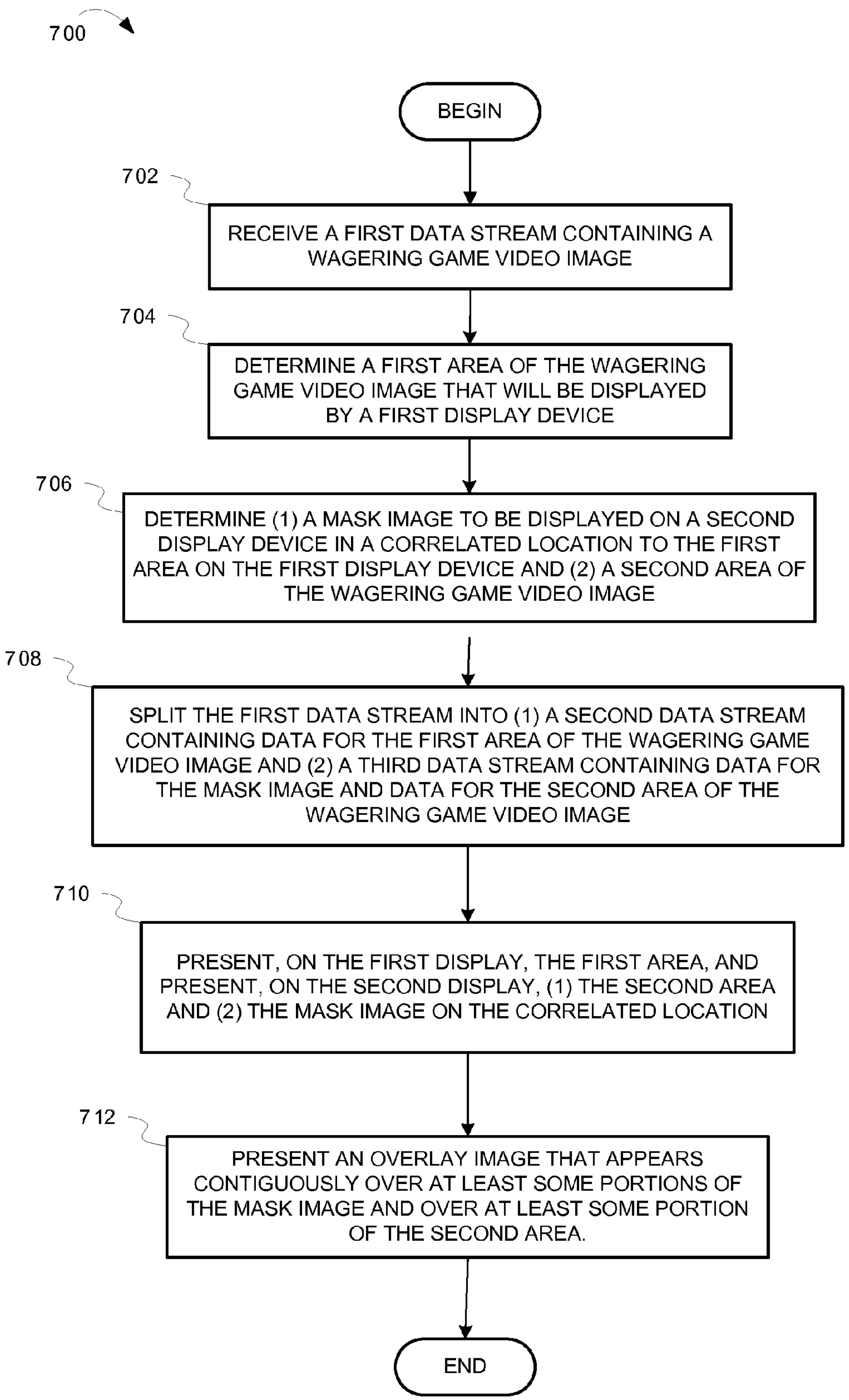
FIG. 7 is a flow diagram 700 illustrating splitting a single video stream into multiple video streams containing different wagering game images, according to some embodiments.

FIG. 7 is a flow diagram illustrating splitting a single video stream into multiple video streams containing different wagering game images, according to some embodiments. In FIG. 7, the flow 700 begins at processing block 702, where a wagering game system ("system") receives a first data stream containing a single wagering game video image of a wagering game. The first data stream can be a stream of video data that includes moving images. More specifically, the stream of video data includes dynamically changing display elements (e.g., pixels, voxels, scan lines, etc.) that change color, contrast, frequency or other visual characteristics according to movement displayed on the wagering game. The data stream can also contain still images (e.g., photos, icons, etc.), text (e.g., game statistics, player information, etc.), and any other visual information that can be presented within the wagering game. The wagering game video image can be a composite image of different smaller images, including one or more game play images (e.g., reel images, playing card images, etc.), one or more game theme images, background imagery, foreground imagery, settings, mise-en-scene imagery, environmental context imagery, virtual landscaping, images of structural surroundings, images of enclosures, celebratory animations, and images of any other item or object that relates to wagering game content. The system can generate the first data stream (e.g., via a wagering game processor), or receive the data stream from another source (e.g., a server, a television station, a video camera, a digital video disc player, etc.).

The flow 700 continues at processing block 704, where the system determines a first portion of the wagering game video image that will be displayed by a first display device. The first portion can include video data for a first set of wagering game objects ("first objects") that can be displayed using the first display device. The first objects can be any geometric shape. In some embodiments, the first objects can be game play elements, like the slot reel images shown in FIGS. 1, 3, 4 and 5. The first objects can also include any kind of imagery associated with the wagering game play elements (e.g., objects surrounding the game play elements, some background game theme objects that are closely tied to the game play elements, etc.). The system can determine the locations of pixels that correspond to the first game objects. In one example, the system can determine the coordinates of the first objects by accessing pre-determined pixel coordinate values (e.g., access a manually generated template indicating the pixel coordinates for game play images, accessing game data configuration files, receiving pixel coordinate information from a wagering game server, etc.). The system can also determine the locations of the pixels by analyzing the wagering game video image to look for specific characteristics (e.g., shapes, colors, movements, borders, etc.) possessed by the first objects.

The flow 700 continues at processing block 706, where the system determines (1) a mask image to be displayed on a second display device in a correlated location to the first portion on the first display device, and (2) a second portion of the wagering game video image. The mask image includes at least one static pixel that corresponds to the same location as a dynamically changing pixel on the wagering game video image (see FIG. 3 above as an example). The mask image can be a mask, as described above in other Figures. The mask can be a buffered image of the wagering game video image, a stored color or pattern, a transparent section, etc. The system can determine the second portion, which can contain a second set of wagering game objects (e.g., second objects) different from the first objects in the wagering game video image. In some embodiments, the second portion can be the rest of the wagering game video image that excludes the first portion. In some embodiments the second portion can contain game theme imagery, foreground images, etc. that surround game play images contained within the first portion. In some embodiments, there can be multiple first portions, or in other words, multiple non-contiguous sections of the wagering game video image (e.g. multiple, but separate, wagering game play images). The second portion can include the portions of the wagering game video image that surround the multiple first portions. An example of a wagering game video image with multiple first portions is illustrated in FIG. 1, where the multiple "first" portions are the three reels 104 and the second portion is the game theme imagery that surrounds the reels 104.

The flow 700 continues at processing block 708, where the system splits the first data stream into (1) a second data stream containing data for the first portion of the wagering game video image and (2) a third data stream containing data for the mask image and data for the second portion of the wagering game video image. For example, the system can scan through the coordinates of the wagering game video image while simultaneously referencing a mask template which stores coordinates for a mask of the first portion. As the scan comes upon any game video image coordinate that is associated with a mask coordinate, the system can associate the pixels for those coordinates with a first value. As the scan comes upon any other game video image coordinates that do not correspond to a mask coordinate, the system can associate the pixels for those coordinates with a second value. The system can then use the first and second values to differentiate pixels from the first data stream into respective second and third data streams. The second and third data streams, therefore, can include different parts of the first data stream, resulting in an eventual presentation of different looking images.

The flow 700 continues at processing block 710, where the system presents, on the first display, the first portion, and presents, on the second display, (1) the second portion and (2) the mask image on the correlated location of the first portion. The second display can be positioned so that the first portion and the mask image appear aligned with each other along a viewing axis, as described in FIG. 3. The first portion can include one or more dynamically changing images that change appearance according to movement displayed on the wagering game video image. The mask image can include one or more non-dynamic images (e.g., a buffered image, an opaque graphic, a transparent portion, etc.) that correspond to the same location as the dynamically changing image(s) in the first portion. The second portion can also include dynamic or static images according to movement displayed on the wagering game video image. The system can map pixels from the second data stream onto the first display. At the same time, the system can map pixels from the third data stream onto the second display, so that dynamic pixels and corresponding static pixels are aligned sufficiently that they appear one in front of the other along a forward facing viewing axis, as described in FIG. 3. The system can map the pixels for the first portion onto the first display device based on the size, orientation and/or resolution of the first display device. For example, in FIG. 6, the top display 603 may be smaller and may have a different shape than the main bottom display 602 below it. The system can take into consideration the differences in the sizes and map the first portion, the mask image, and the second portion accordingly. In other embodiments, however, the top display 603 and bottom display 602 may be the same size and/or resolution. FIGS. 8 through 11 illustrate possible examples of generating mask images for video streams of equal resolutions.

The flow 700 continues at processing block 712, where the system presents an overlay image that appears over some portion of the wagering game video image. For instance, the overlay image can be a pay line graphic that runs across the mask image and the second portion, as illustrated in FIG. 5, where the pay line 518 runs across the masks 515 and the theme imagery 505. The pay line graphic is an example of an overlay image that appears contiguously across the mask image and also extends into the second portion. In another example, the overlay image may be an animated character, as described in FIG. 3, that may cross over a border of the mask image (e.g., the mask border 319) as the animated character moves from, or to, the second portion. In some embodiments, the system can also present an overlay image that appears only in the first portion, the mask image, and/or the second portion.

The timing of the operations can vary based on the type of game being played. For example, the system can present a game where the mask image is displayed most of the time as a transparent image, to see through a front display to active game elements on a back display. FIGS. 1, 3, 4 and 5 illustrate embodiments. In other examples, however, the system can present a wagering game where the wagering game video image is displayed on a front display, most of the time, but occasionally, the system generates one or more transparent masks (e.g., the mask image). The system can display the transparent masks momentarily to reveal information on the back display. An example is a wagering game with images of doors, where the game reveals images on the back display by "opening" the doors on the front display. The system can detect when someone touches a door on the front display. Once detected, the system can animate the opening of the selected door to reveal the back image. "Opening" the doors is equivalent to displaying a transparent mask image on the front display to reveal images on the corresponding portion of the first portion of the back display. The system can display the transparent mask image immediately, or slowly. For instance, the system can display a transparent pixel for the mask image on every other, third, fourth, etc. pixel until all pixels in the first portion are transparent (e.g., the selected door slowly dissolves away). The system can display transparent pixels in a pattern (e.g., the door dissolves from left to right, top to bottom, from the center to the edges, etc.). The system can make the mask image reverse its transparency in a similar fashion (e.g., the door can reappear slowly, from left to right, etc.).

Figure 8:
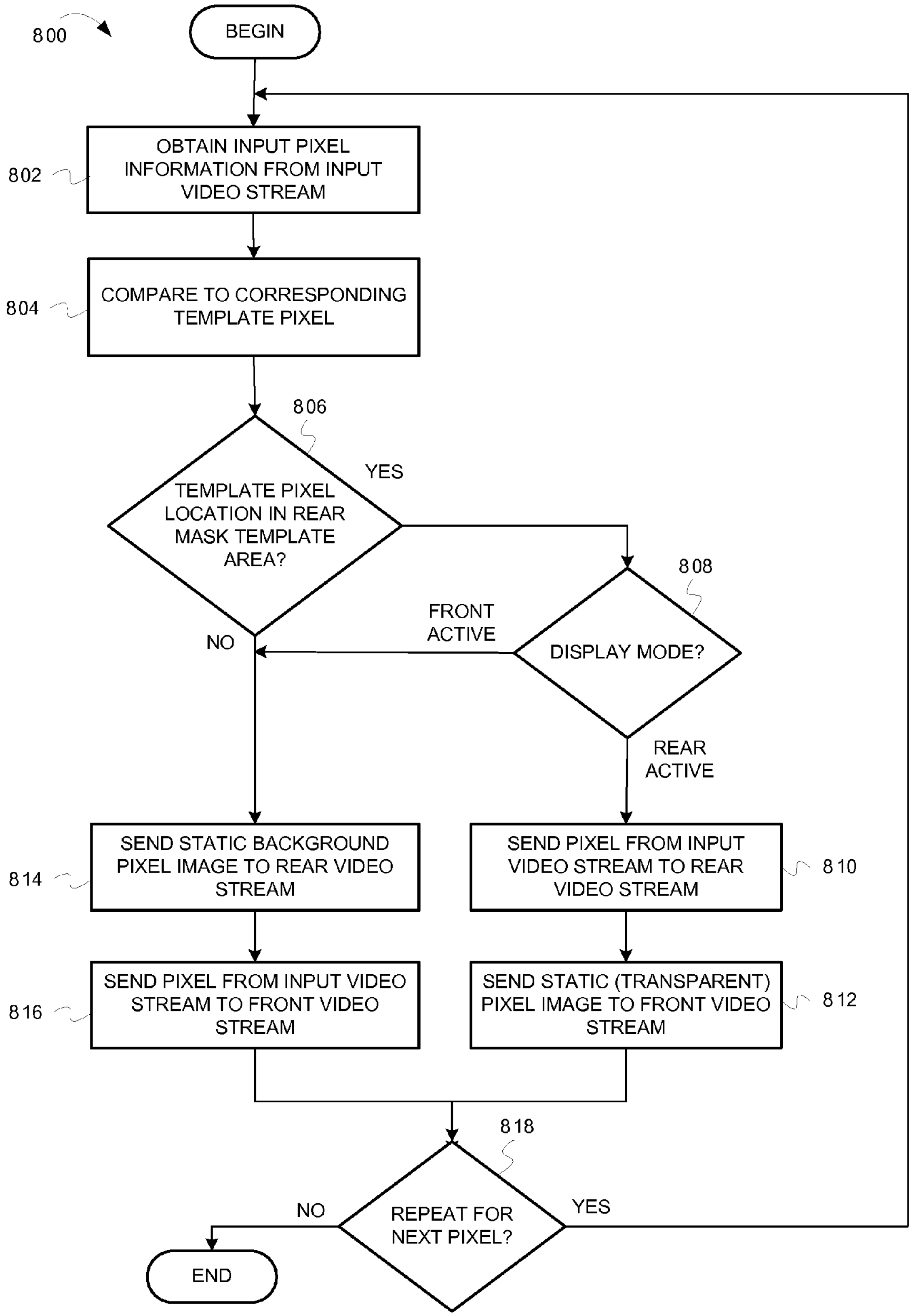
FIG. 8 is a flow diagram 800 illustrating splitting a single wagering game video stream into multiple video streams for wagering game displays with the same resolution, according to some embodiments.
Figure 9:
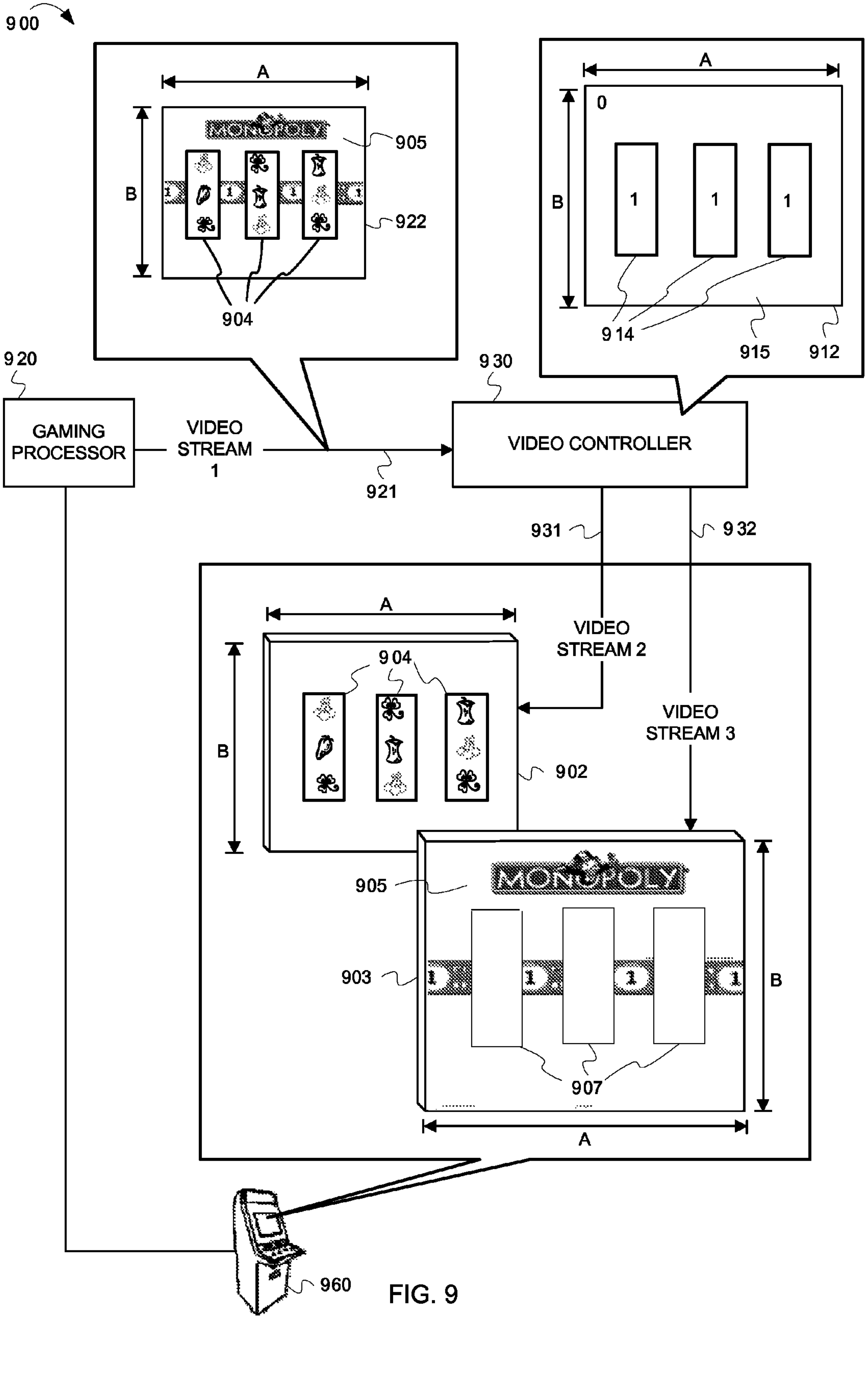
FIG. 9 is a an illustration of multiple wagering game displays with the same resolution and a mask template that controls the placement of pixels from a single video stream on multiple overlapping wagering game displays, according to some embodiments.

Splitting a Single Wagering Game Video Stream into Multiple Video Streams for Wagering Game Displays with the Same Resolution FIG. 8 is a flow diagram 800 illustrating splitting a single wagering game video stream into multiple video streams for wagering game displays with the same resolution, according to some embodiments. This description will present FIG. 8 in concert with FIG. 9. In FIG. 8, a flow 800 begins at processing block 802, where a wagering game system ("system") obtains information for a pixel ("input pixel") from a first video stream ("input video stream"). The system operates on one pixel at a time from the input video stream moving at a given pixel resolution and pixel change rate (e.g., a refresh rate for a raster scan of an analog video frame, a response time for transitions on a digital video picture, etc.), through each pixel of a wagering game image within the input video stream. FIG. 9 illustrates an example. FIG. 9 is an example illustration of multiple wagering game displays with the same resolution. FIG. 9 is similar to FIG. 1 where many of the components are configured to perform similar functions. In FIG. 9, a wagering game system ("system") 900 includes a wagering game machine 960, with a gaming processor 920, a video controller 930, a rear display 902 and a front display 903. The gaming processor 920 generates a first video stream 921. The first video stream 921 includes a single game video image ("video image") 922 (e.g., a video frame) at any point in time with the pixel resolution dimensions of width ("width A") and height ("height B"). The gaming processor 920 generates the video image 922 at a specific frame rate and pixel change rate for the resolution dimensions A and B. The single game video image 922 contains multiple parts such as a first set of game play images, or objects, (e.g., game play reels ("reels") 904) and a second set of theme images or objects (e.g., the themed imagery 905 that surrounds the reels 904). The video controller 930 splits the first video stream 921 into two (or more) video streams (e.g., a second video stream 931, and a third video stream 932) using a mask template 912. The second video stream 931 and third video stream 932 have the same resolution dimensions (e.g., width A, height B) and pixel change rate as the first video stream 921. The mask template 912 also has the same resolution dimensions. The video controller 930 receives one pixel of input at a time from the first video stream 921 and determines whether to send the pixel to the second video stream 931 or the third video stream 932, using the mask template 912 as a reference chart. The flow 800, continued below, describes in detail how the video controller 930 can use the mask template 912 and to send the pixels, one at a time, to the output video streams 931 and 932, and on to the rear display 902 and front display 903 respectively.

The flow 800 continues at processing block 804, where the system compares the input pixel information to a mask template pixel ("template pixel") that corresponds to the same location as the input pixel. In FIG. 9, the mask template 912 includes the same dimensions as the video image 922. Therefore, each individual input pixel in the first video stream 921, making up the video image 922, has a corresponding individual template pixel, with the same location coordinates, on the mask template 912. The video controller 930 scans through the mask template 912 at the same frame rate and pixel change rate as the first video stream 921, thus reading a template pixel at that same location as the input pixel is on the video image 922. The video controller 930 reads the template pixel on the mask template 912 to determine a value that has been assigned to that template pixel. For example, the mask template 912 can store a one bit value per template pixel. A mask template area 915 may have a first value (e.g., logical "0") stored and associated with each template pixel in that mask template area 915. The mask template area 915 can correspond to the portion of the video image 922 that contains the themed imagery 905 that surrounds the reels 904, which is to be sent to the front display 903. Consequently, the mask template area 915 may be referred to as the "front mask template area" 915. Some mask template areas 914, on the other hand, may have a second value (e.g., a logical "1") stored and associated with each template pixel in the mask template areas 914. The mask template areas 914 can correspond to the areas of the video image 922 that contain the reels 904, which are to be sent to the rear display 902. The mask template areas 914, therefore, may be referred to as the "rear mask template area" 914. The mask template 912 can be pre-defined to include the exact dimensions and locations for the rear mask template area 914 and the front mask template area 915 and stored in the video controller 930, or in a memory store accessible to the video controller 930. The system 900 may store many different mask templates based on a wagering game theme, type, conditions, game mode, etc. The gaming processor 920 can select the appropriate mask template 912 for the video controller 930 to reference. The video controller 930 can use more than one mask template within a single wagering game (e.g., in the case of a bonus game, a help screen, or other modifications to the video image 922 where information other than, or in addition to, the slot reels 904 may need to be displayed on the rear display 902). The gaming processor 920 can also choose from other mask templates for other wagering games (e.g., video poker, video bingo, etc.), progressive games, tournament games, bonus games, or any other wagering game where game play elements with sizes different than the reels 904 need to be displayed on the rear display 902. In some embodiments, the mask template 912 may not have pre-defined values, rather the gaming processor 920, based on game logic, can generate a template, or provide the values to a blank template, indicating where the rear mask template area 914 and front mask template area 915 should be located and their one bit values. In some embodiments, the video controller 930 or gaming processor 920 can change the values to redefine the location for the rear mask template areas 914 and the front mask template area 915 on the mask template 912 based on game conditions, game types, peripheral device changes, or other factors (e.g., the first video stream 921 may change resolution, based on the same changes to resolutions for displays 902 and 903, so the gaming processor 920 updates the rear mask template area 914 and the front mask template area 915 on the mask template 912 to match pixel locations for the changed resolution dimensions). In some embodiments, the gaming processor 920 can dynamically change the values on the mask template 912 based on the game conditions.

The flow 800 continues at processing block 806, where the system determines whether the location of the input pixel from the input video stream is within one or more rear mask template areas. For example, in FIG. 9, the video controller 930 determines whether the input pixel should go to the rear display 902 or the front display 903 based on what the mask template 912 indicates. If the location of the input pixel from the first video stream 921 corresponds to a template pixel location within the rear mask template area 914, then the video controller 930 determines that the input pixel from the first video stream 921 should be sent to the rear display 902. In other words, the video controller 930 may read that the template pixel location is within the rear mask template area 914, which may indicate the one bit logical value "1", thus indicating that that the input pixel should be sent to the second video stream 931. As stated before, the second video stream 931 has the same resolution dimensions and pixel change rate as the first video stream 921. Because the resolution dimensions in the second video stream 931 are the same as the resolution dimensions for the first video stream 921, and also the same resolution dimensions as the mask template 912, the input pixel sent to the second video stream 931 will appear in the same location on the rear display 902 as the input pixel appears on the video image 922. Returning to FIG. 8, if the pixel location from input video stream is in a rear mask template area, then the flow 800 continues at processing block 808. Otherwise, the flow 800 continues at processing block 814.

The flow 800 continues at processing block 808, where the system determines a display mode. For example, in FIG. 9, the gaming processor 920 can send a command to the video controller 930 that represents a display mode. There may be two display modes, a "Front Active" mode and a "Rear Active" mode. For example, sometimes the gaming processor 920, based on game conditions, may need to send all live video to the front display 903. For instance, when animations (e.g., pay lines) move or appear across portions of the slot reels 904 and theme imagery 905, the animations may appear discontinuous or fragmented when viewed as an overlapped display view (e.g., slots reels 904 on the rear display 902 and theme imagery 905 on the front display 903). Consequently, the gaming processor 920 may require all pixels from the first video stream 921 to go to the front display 903, using the Front Active mode, to make animations appear correctly. At other times, however, such as by default, the gaming processor 920 can display the overlapped display view, using the Rear Active mode, to split up the live video feed from the first video stream 921 into the second video stream 931 and third video stream 932, so that each stream contains its live portion of data based on the information indicated in the mask template 912.

The flow 800 continues at processing block 810, where the system, in the Rear Active (e.g., default) mode, sends the input pixel to a rear display video stream ("rear video stream"). The system, at processing block 812, also sends a static pixel image to a front display video stream ("front video stream"). The static pixel can be a transparent pixel (e.g., a "white" pixel), so that the pixel on the rear display can be viewed through the front display. For example, FIG. 9 illustrates an example of the Rear Active mode, where the video controller 930 displays live video of the slot reels 904 on the rear display 902 (thus illustrating processing block 810) while also presenting transparent masks 907 on the front display 903 (thus illustrating processing block 812). The video controller 930 can create the effect of one or more transparent windows (i.e., transparent masks 907) on the front display 903 by presenting transparent (white) pixels. The second video stream 931 and the third video stream 932 have the same resolution dimensions and pixel change rate as the first video stream 921. Consequently, the input pixel sent to the second video stream 931 and the static "transparent" pixel sent to the third video stream 932 will appear, respectively, in the same locations on the rear display 902 and the front display 903 as the input pixel appears on the video image 922.

The flow 800 continues at processing blocks 814 and 816, where the system sends a static background pixel image to the rear video stream and the input pixel to the front video stream. The system determines that the template pixel location is not in a rear mask portion or that the template pixel location is in a rear mask but the system is in Front Active mode. Thus, the system sends a static pixel image to the rear video stream at processing block 814, and also sends the live video input pixel to the front video stream at processing block 816. In some embodiments, the background pixel image can be 'frame grabbed' from the live input video stream. In other embodiments, the background pixel image can be obtained from an image store of background images. In some embodiments, the background pixel can be a dark color to provide contrast to images that are displayed on the front display. For instance, referring to FIG. 5, the front display 503 is see-through over most of its surface area. As a consequence, when an input pixel is displayed on the front display 503 (e.g., in the wagering game theme imagery 505), the corresponding pixel on the rear display 502 should be dark (e.g., a solid "black" color) to provide contrast to the front pixel. Referring now to FIG. 9, in some embodiments, the front display 903 may be like the front display 503, in that most of the opaque layers have been removed from the front display 903, thus allowing the front display 903 to be see-through over most of its surface area. As a result, the system 900 can present the transparent masks 907 in other locations (e.g., by using a different mask template that has different locations for the front mask template area 915 and the rear mask template area 914) on the front display 903 and/or move the transparent masks 907 around the front display 903 (e.g., by dynamically changing values in the mask template 912). In other embodiments, however, the front display 903 may be similar to the front display 103 in FIG. 1, where the front display 103 is see-through only on the locations of the transparent masks 107 because the opaque layers of the front display may have been removed only behind the location of the transparent masks 107. Consequently, at processing block 814, the static image may not need to be a dark color to provide contrast. As a result, the system may use a buffered or stored image of a previously displayed pixel from the input video stream, or any default colored pixel that may be stored in memory and/or obtained from an image store.

The flow 800 continues at processing block 818, where the system can repeat the process for the next pixel as the system moves to the next pixel location in the input video stream at the given pixel change rate. In FIG. 9, some embodiments were described where the gaming processor 920 may (1) change mask templates based on new games that are loaded into the wagering game machine 960, (2) change values on the mask template 912, (3) change display modes, and/or (4) change stored pixel images by accessing image stores. The system 900 can time the changes to occur after the last pixel of the video image 922 (e.g., frame) is displayed during a pixel change scan (e.g., a raster scan), such as during a vertical blanking interval.

Figure 10:
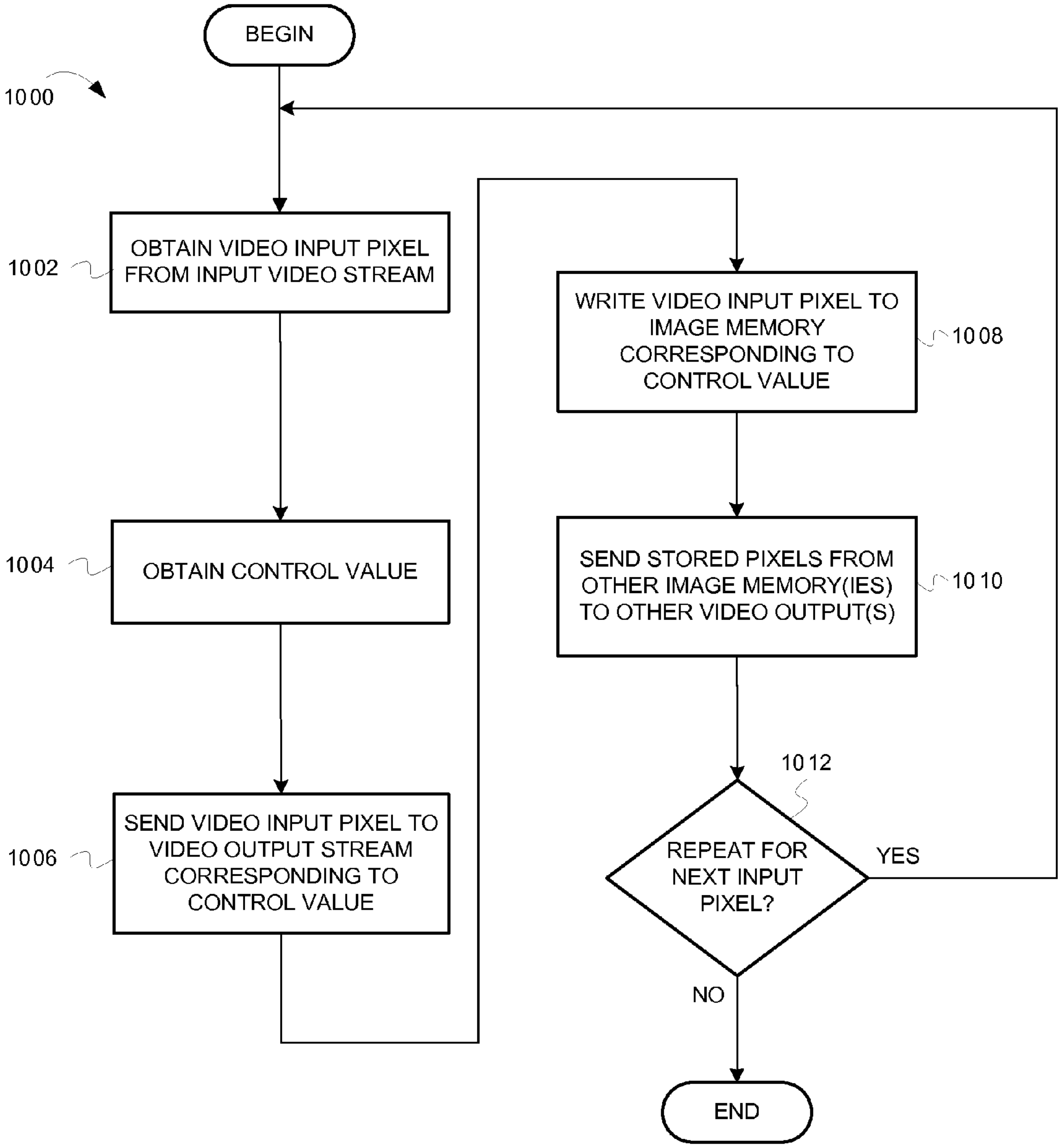
FIG. 10 is a flow diagram 1000 illustrating splitting a single wagering game video stream into multiple video stream outputs using control values and image memories, according to some embodiments.
Figure 11:
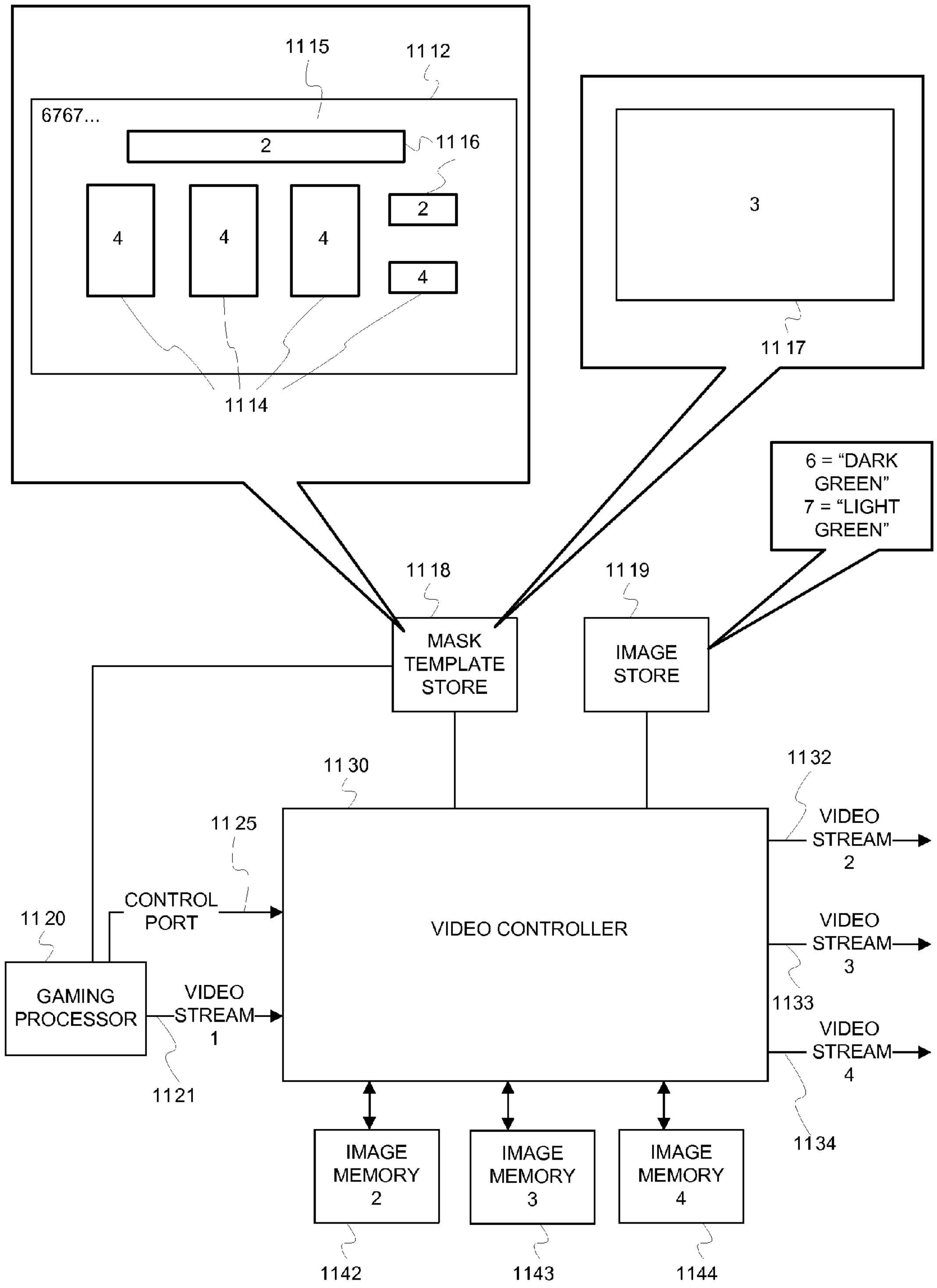
FIG. 11 is an illustration of a video controller that uses multiple image memories and control signals to direct pixels from a single video stream, and/or other images sources, to multiple video streams.

Splitting a Single Wagering Game Video Stream into Multiple Video Streams Using Multiple Image Memories FIG. 10 is a flow diagram 1000 illustrating splitting a single wagering game video stream into multiple video stream outputs using control values and image memories, according to some embodiments. This description will present FIG. 10 in concert with FIG. 11. FIG. 11 is an illustration of a video controller 1130 that uses multiple image memories 1142, 1143, and 1144, and control signals to direct pixels from an input video stream 1121, and/or other images sources, to multiple output video streams 1132, 1133, and 1134. For example, in some embodiments, the video controller 1130 can send the output video streams 1132, 1133, and 1134 to multiple displays, where no more than one display receives live video. The other displays instead display a stored, static image from their respective image memories. In other words, each of the output video streams 1132, 1133, and 1134 can be assigned a specific image memory 1142, 1143 or 1144. In this example, image memory 1142 is assigned to output video stream 1132, image memory 1143 is assigned to output video stream 1133 and image memory 1144 is assigned to output video stream 1134. Consequently, the video controller 1130 can feed multiple displays of a wagering game, where the displays are used basically as signs, showing static graphical images. One example of such an image is the pay table of the game; another might be a help screen, or advertising information, etc. Further, although FIG. 11 shows only three output video streams 1132, 1133, and 1134, and three corresponding image memories 1142, 1143 and 1144, the video controller 1130 can have any number of output video streams and any number of corresponding image memories. In addition, although image memories 1142, 1143, and 1144 are show as separate elements, they may all reside within a single memory unit with separate memory locations allocated to the image memories 1142, 1143, and 1144. Further, the image memories 1141, 1143, and 1144 contain enough memory to store as many pixels are needed to generate an entire image (e.g., video frame) on an output video display (e.g., all the pixels for a given frame at a display resolution on that display).

Returning momentarily to FIG. 10, a flow 1000 begins at processing block 1002, where the video controller 1130 obtains a video input pixel from the input video stream 1121. The video controller 1130 can obtain the input pixel from a gaming processor 1120. The gaming processor 1120 can generate the input pixel and send the input pixel within the input video stream 1121 to the video controller 1130.

The flow 1000 continues at processing block 1004, where the video controller 1130 obtains a control value. In some embodiments, the video controller 1130 can obtain the control value from the gaming processor 1120 via a control port 1125. The video controller 1130 uses the control value to determine which of the output video streams 1132, 1133, and 1134 will receive the input pixel. In other words, the video controller 1130 can receive the input video stream 1121, and send it to the appropriate output video stream (1132, 1133, or 1134) based upon the command information on the control port 1125 from the gaming processor 1120. In other embodiments, however, the video controller 1130 can obtain the control value from a mask template store 1118, using one or more mask templates (e.g., 1112, 1117) to determine which of the output video streams 1132, 1133, and 1134 will receive the input pixel based on values written into the mask templates 1112, 1117. For example, the video controller 1130 may read the mask template 1112 based on control information from the gaming processor 1120 indicating which mask template to access. The video controller 1130 can read the mask template 1112 as described in FIGS. 8 and 9, where every individual pixel on the mask template 1112 may correspond to individual displayed pixels for video displays connected to the output video streams 1132, 1133, 1134. For example, the output video streams 1132, 1133, and 1134 can have the same resolution dimensions, frame rate and pixel change rate as the input video stream 1121 and the mask template 1112.

The flow 1000 continues at processing block 1006, where the video controller 1130 sends the input pixel to the video output stream that corresponds to the control value. For example, the control value may be a value that correlates to one of the output video streams 1132, 1133, or 1134. For simplicity, this example uses a value of "2" to correlate with the output video stream 1132, a value of "3" to correlate with the output video stream 1133, and a value of "4" to correlate with the output video stream 1134. For instance, if the control value is the value of "2" (e.g., the control port 1125 provides a value of "2", or the template pixel presents a value of "2" from a mask portion), then the video controller 1130 sends the input pixel to output video stream 1132, which correlates with the value of "2". The mask template 1112 includes different mask template areas 1114, 1115, 1116. The mask template areas 1116 include the values of "2" for template pixels within those mask template areas 1116, which, as described would correlate to the video output stream 1132. The mask template areas 1114, on the other hand, include the values of "4" for template pixels within those mask template areas 1114, which would correlate to the video output stream 1134. Other templates, when in use, such as template 1117, may include the value "3", which would correlate to the video output stream 1133.

The flow 1000 continues at processing block 1008, where the video controller 1130 writes the input pixel to an image memory that corresponds to the control value. For example, similar to in processing block 1006, if the control value is "2", the video controller would send the input pixel to the video output stream 1132, and so forth for the control value of "3" (to image memory 1143) and control value "4" (to image memory 1144). The video controller 1130 writes the input pixel to the image memory that corresponds to the control value so that the image memory can store the input pixel and display it when the flow 1000 has moved on to another pixel (see processing block 1012) and/or to display a frozen, or static image, of the last time that the image memory and corresponding output video stream received the video input stream. Consequently, the video controller 1130 can present multiple static images (e.g., signs, displays, etc.) that derived from a frame of the input video stream 1121. FIG. 6 illustrates an example where the top display 603 illustrates a frozen frame of the bottom display 602.

The flow 1000 continues at processing block 1010 where the video controller 1130 sends the stored values from the image memories to output video streams that are not currently receiving the input video pixel. In other words, while only one output video stream receives the input video pixel, at the same time, the other output video streams need to present video pixels as well, or else their respective video displays would be blank. So, the video controller 1130 sends the stored pixels from the other image memories to the other video output streams. More specifically, if the control value were "2", then the video controller 1130 would send the input pixel to the output video stream 1132, but, concurrently, would also send a pixel value stored in image memory 1143 to the output video stream 1133 and would also send a pixel value stored in image memory 1144 to output video stream 1134. As the control values change, the image memories get filled with the last input pixel that was sent to the video output stream, and thus the displays associated with the video output streams can appear to show frozen images of past video images.

In some embodiments, the video controller 1130 may determine that any of the image memories 1142, 1143, 1144 and/or any of the output video streams 1132, 1133, 1134 need an image that is not currently stored in the respective image memories and/or that is different from the available input pixel. For example, the mask template 1112 may indicate a repeating pattern of values (e.g., repeating "6" and "7" values) for mask template area 1115. The repeating "6" and "7" values correlate to a color stored in an image store 1119. The video controller 1130, therefore, can obtain those colors from the image store indicating a background color with alternating dark green and light green pixels. At the same time, the gaming processor 1120 can provide a control value on the control port 1125 indicating which image memory and/or output video stream should receive the background pixel colors. The resulting display may appear like the top display 603 in FIG. 6, where the background imagery is different than that of the lower display 602. In other words, the video controller 1130, during one pixel scan of the lower image, may have read from the template 1112 that replaced the game background imagery with the background images from the image store 1119. Subsequently, the top display 603 could read from its stored image memory to continuously display that background imagery while the gaming processor 1120 switched the mask template 1112 to another mask template that used the game theme background images from the input video stream 1121. The gaming processor 1120 could then switch the control value so that the input video stream 1121 would be sent to the lower display 602. In some embodiments, the video controller 1130 can instead send background images directly to, and store them in, appropriate image memories without using a separate image store 1119.

In some embodiments, the gaming processor 1120 can set the control value to a specific value (e.g., "0") that indicates that none of the image memories 1142, 1143, 1144 would get modified, and all the output video streams would read from the stored images in their respective image memories.

The flow 1000 continues at processing block 1012 where the flow 1000 can repeat for the next input pixel of the input video stream 1121.

In some embodiments, some pixels have been described herein as being live, or dynamic, versus other pixels that are described as being static. FIG. 3 clarifies an example of the interplay between static and dynamic pixels on various screens. For instance, in FIG. 3, the video controller 130 (of FIG. 1) can display pixel A 306 as a live, or dynamic, pixel (e.g., periodically changing appearance based on the movement in the wagering game video image). At the same time, the video controller 130 can display the corresponding pixel A' 309 as a static pixel. (e.g., a stored video pixel, a single-colored pixel, a clear pixel, etc.). In other words, pixel A 306 and pixel A' 309 can have a reciprocal relationship between static and dynamic.

In some embodiments, neighboring pixels on one monitor can share the same reciprocal relationship with their corresponding pixels on the other monitor. For example, when pixel A 306 is dynamic, pixel B 308 can also dynamic, as they both reside within the portion of the rear display 302 showing the reel image 304. At the same time, corresponding pixel A' 309 and corresponding pixel B' 311 can be held static (e.g., transparent so that pixel A 306 and pixel B 308 can be seen). In some embodiments, however, other relationships can exist between neighboring pixels and their corresponding pixels. For example, in some embodiments, neighboring pixels can be alternating dynamic and static. In other words, pixel A 306 can be dynamic while pixel B 308 can be static. In that instance, pixel A' 309 can be static (e.g., transparent) so that pixel A 306 can be seen. However, since pixel B 308 is static, pixel B' 311 can be dynamic. This can give the impression that live video is occurring on both displays 302 and 303. This "duo" live display can create certain effects like "shimmering" effects, 3D effects, grainy video effects, etc.

The video controller 130 can also control blocks of specific pixels to generate the appearance of moving objects on the front display 303, while displaying only the reel image 304 on the rear display 302. For example, the game video image (e.g., single game video image 122 of FIG. 1) may include an animation of a character that moves across the reel image 304. The single game video image 122, if displayed on just one display, would replace pixel colors of the reel image 304 with the colors of the animated character. However, with two display that overlap, the video controller 130 can separate the animated character from the reel image 304 and display the animated character only on the front display 303 while displaying only the reel image 304 on the rear display 302. The video controller 130 can do so using stored pixel maps for the reel image 304 and for the animated character. More specifically, for instance, the video controller 130 can generate a first pixel map ("reel image map") of how the reel image 304 appears before the animated character appears. The reel image map includes information about the visual characteristics (e.g., color, hue, etc.) for each pixel coordinate of the reel image 304. The video controller 130 can generate a second pixel map ("animated character pixel map") of how the animated character would appear. The video controller 130 can determine the pixel locations that the character would make before it appears by analyzing the movement of the character before it is displayed (e.g., run a background simulation of the animation and/or delay the animation display on the displays 302, 303 while analyzing movement). The video controller 130 can track the animation based on the changing visual characteristics (e.g., colors, hues, etc.) of the moving, dynamic pixels against the static pixels of the reel image 304 stored in the reel image pixel map. The video controller 130 stores, in the animated character pixel map, information concerning which pixels changed, their coordinates, and the changes to their visual characteristics. The video controller 130 can then display only the animated character pixels as dynamic pixels on the front display 303. The video controller 130 can use transparent pixel masks for any pixels that surround the character, or that fill in gaps or spaces inside the character, so that only the character appears on the front display 303. At the same time, the video controller 130 displays the frozen reel image 304 on the rear display 302. The animated character would thus appear to be floating above the reel image 304.

Additional Example Operating Environments

This section describes example operating environments, systems and networks, and presents structural aspects of some embodiments.

Wagering Game Machine Architecture

Figure 12:
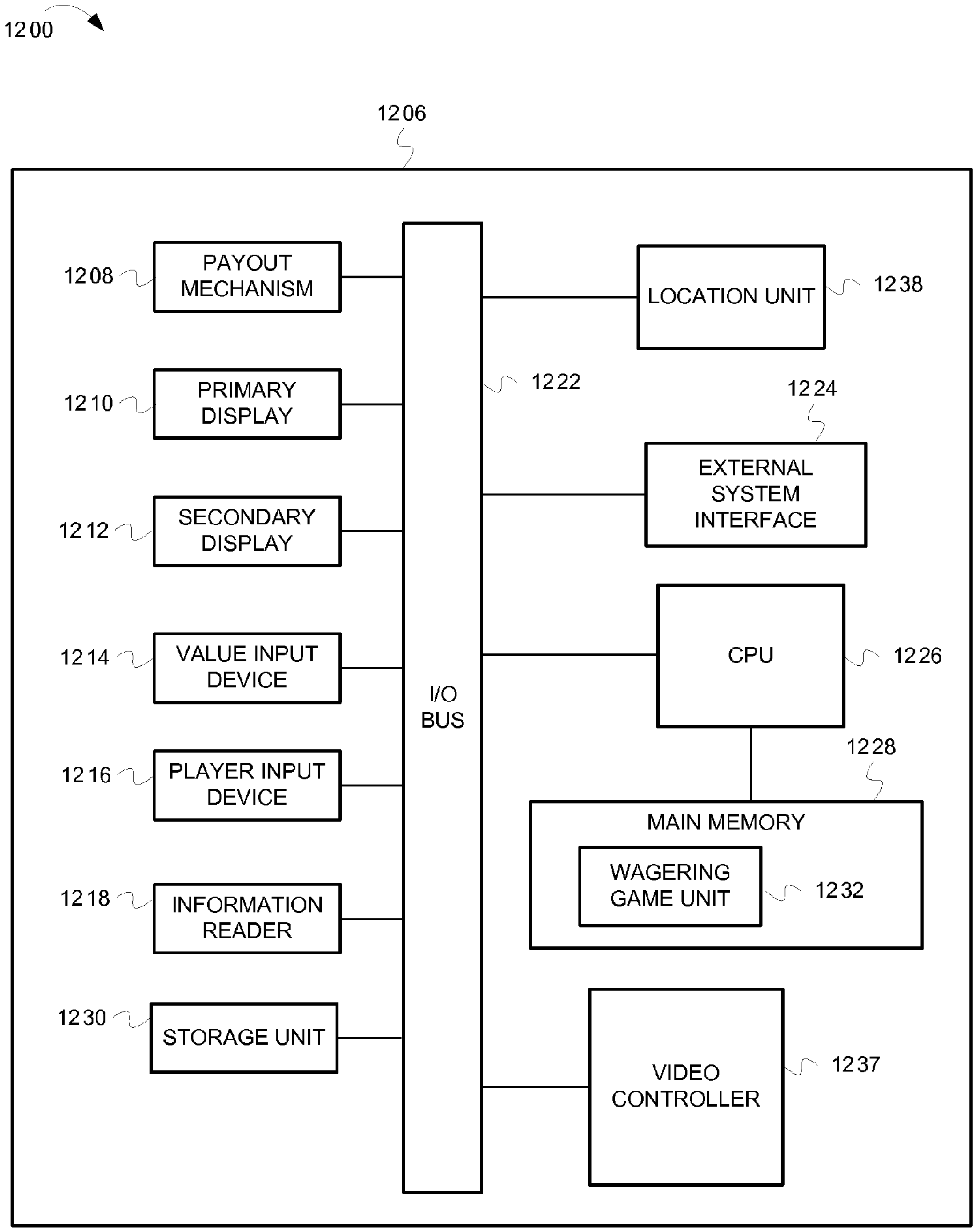
FIG. 12 is an illustration of a wagering game machine architecture 1200, according to some embodiments.

FIG. 12 is a conceptual diagram that illustrates an example of a wagering game machine architecture 1200, according to some embodiments. In FIG. 12, the wagering game machine architecture 1200 includes a wagering game machine 1206, which includes a central processing unit (CPU) 1226 connected to main memory 1228. The CPU 1226 can include any suitable processor, such as an Intel® Pentium processor, Intel® Core 2 Duo processor, AMD Opteron™ processor, or UltraSPARC processor. The main memory 1228 includes a wagering game unit 1232. In some embodiments, the wagering game unit 1232 can present wagering games, such as video poker, video black jack, video slots, video lottery, reel slots, etc., in whole or part.

The CPU 1226 is also connected to an input/output ("I/O") bus 1222, which can include any suitable bus technologies, such as an AGTL+ frontside bus and a PCI backside bus. The I/O bus 1222 is connected to a payout mechanism 1208, primary display 1210, secondary display 1212, value input device 1214, player input device 1216, information reader 1218, and storage unit 1230. The player input device 1216 can include the value input device 1214 to the extent the player input device 1216 is used to place wagers. The I/O bus 1222 is also connected to an external system interface 1224, which is connected to external systems (e.g., wagering game networks). The external system interface 1224 can include logic for exchanging information over wired and wireless networks (e.g., 802.11g transceiver, Bluetooth transceiver, Ethernet transceiver, etc.).

The I/O bus 1222 is also connected to a location unit 1238. The location unit 1238 can create player information that indicates the wagering game machine's location/movements in a casino. In some embodiments, the location unit 1238 includes a global positioning system (GPS) receiver that can determine the wagering game machine's location using GPS satellites. In other embodiments, the location unit 1238 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 12, in some embodiments, the location unit 1238 is not connected to the I/O bus 1222.

In some embodiments, the wagering game machine 1206 can include additional peripheral devices and/or more than one of each component shown in FIG. 12. For example, in some embodiments, the wagering game machine 1206 can include multiple external system interfaces 1224 and/or multiple CPUs 1226. In some embodiments, any of the components can be integrated or subdivided.

In some embodiments, the wagering game machine 1206 includes a video controller 1237. The video controller 1237 can process communications, commands, or other information, where the processing can generate and control multiple wagering game images from a single wagering game image using masks.

Furthermore, any component of the wagering game machine 1206 can include hardware, firmware, and/or machine-readable media including instructions for performing the operations described herein.

Example Wagering Game Machine

Figure 13:
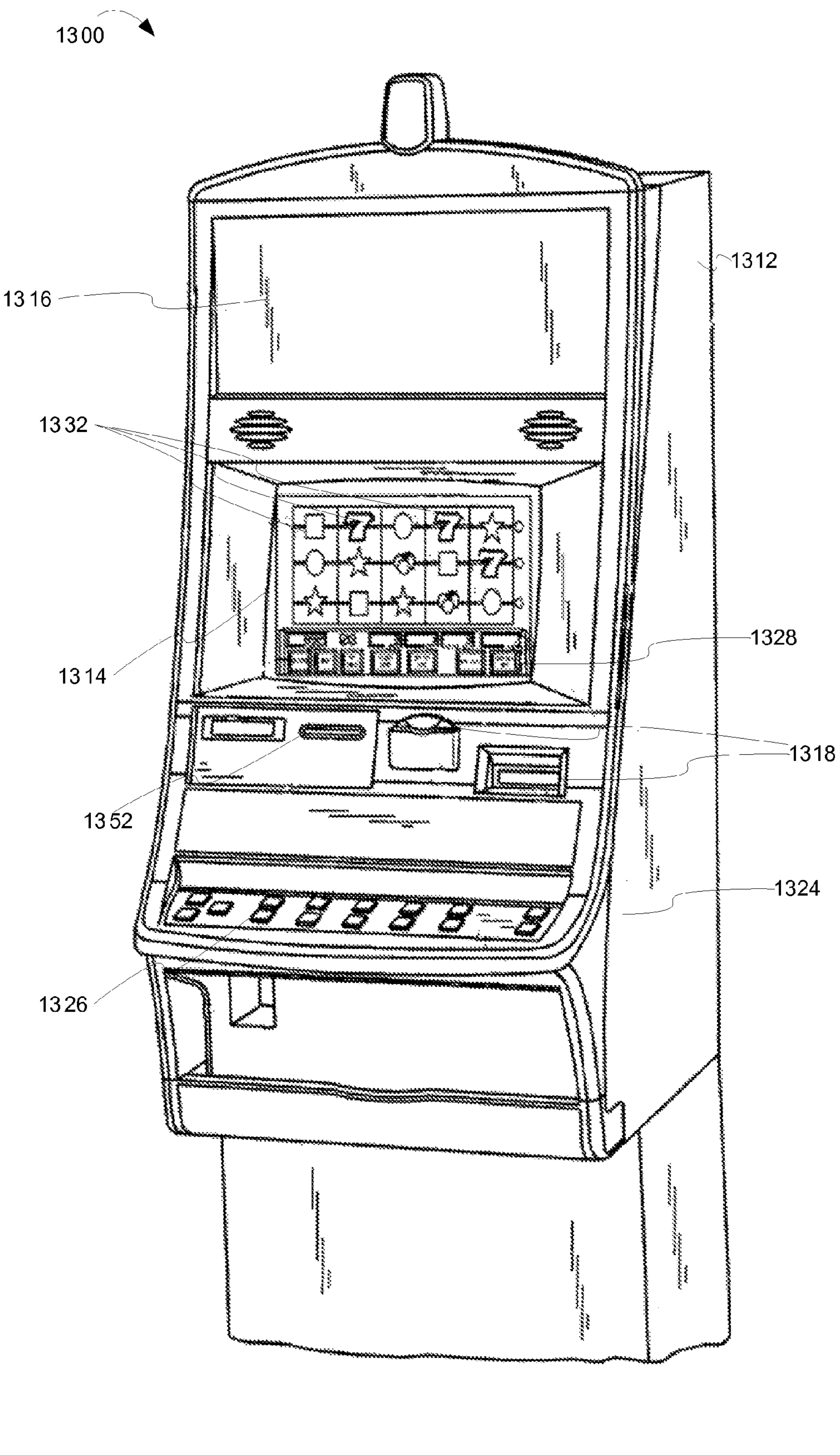
FIG. 13 is a perspective view of a wagering game machine, according to example embodiments of the invention.

FIG. 13 is a perspective view of a wagering game machine, according to example embodiments of the invention. Referring to FIG. 13, a wagering game machine 1300 is used in gaming establishments, such as casinos. According to embodiments, the wagering game machine 1300 can be any type of wagering game machine and can have varying structures and methods of operation. For example, the wagering game machine 1300 can be an electromechanical wagering game machine configured to play mechanical slots, or it can be an electronic wagering game machine configured to play video casino games, such as blackjack, slots, keno, poker, blackjack, roulette, etc.

The wagering game machine 1300 comprises a housing 1312 and includes input devices, including value input devices 1318 and a player input device 1324. For output, the wagering game machine 1300 includes a primary display 1314 for displaying information about a basic wagering game. The primary display 1314 can also display information about a bonus wagering game and a progressive wagering game. The wagering game machine 1300 also includes a secondary display 1316 for displaying wagering game events, wagering game outcomes, and/or signage information. While some components of the wagering game machine 1300 are described herein, numerous other elements can exist and can be used in any number or combination to create varying forms of the wagering game machine 1300.

The value input devices 1318 can take any suitable form and can be located on the front of the housing 1312. The value input devices 1318 can receive currency and/or credits inserted by a player. The value input devices 1318 can include coin acceptors for receiving coin currency and bill acceptors for receiving paper currency. Furthermore, the value input devices 1318 can include ticket readers or barcode scanners for reading information stored on vouchers, cards, or other tangible portable storage devices. The vouchers or cards can authorize access to central accounts, which can transfer money to the wagering game machine 1300.

The player input device 1324 comprises a plurality of push buttons on a button panel 1326 for operating the wagering game machine 1300. In addition, or alternatively, the player input device 1324 can comprise a touch screen 1328 mounted over the primary display 1314 and/or secondary display 1316.

The various components of the wagering game machine 1300 can be connected directly to, or contained within, the housing 1312. Alternatively, some of the wagering game machine's components can be located outside of the housing 1312, while being communicatively coupled with the wagering game machine 1300 using any suitable wired or wireless communication technology.

The operation of the basic wagering game can be displayed to the player on the primary display 1314. The primary display 1314 can also display a bonus game associated with the basic wagering game. The primary display 1314 can include a cathode ray tube (CRT), a high resolution liquid crystal display (LCD), a plasma display, light emitting diodes (LEDs), or any other type of display suitable for use in the wagering game machine 1300. Alternatively, the primary display 1314 can include a number of mechanical reels to display the outcome. In FIG. 13, the wagering game machine 1300 is an "upright" version in which the primary display 1314 is oriented vertically relative to the player. Alternatively, the wagering game machine can be a "slant-top" version in which the primary display 1314 is slanted at about a thirty-degree angle toward the player of the wagering game machine 1300. In yet another embodiment, the wagering game machine 1300 can exhibit any suitable form factor, such as a free standing model, bar top model, mobile handheld model, or workstation console model.

A player begins playing a basic wagering game by making a wager via the value input device 1318. The player can initiate play by using the player input device's buttons or touch screen 1328. The basic game can include arranging a plurality of symbols along a pay line 1332, which indicates one or more outcomes of the basic game. Such outcomes can be randomly selected in response to player input. At least one of the outcomes, which can include any variation or combination of symbols, can trigger a bonus game.

In some embodiments, the wagering game machine 1300 can also include an information reader 1352, which can include a card reader, ticket reader, bar code scanner, RFID transceiver, or computer readable storage medium interface. In some embodiments, the information reader 1352 can be used to award complimentary services, restore game assets, track player habits, etc.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method, comprising:

receiving a first data stream containing a wagering game video image;

determining a first portion of the wagering game video image;

determining a mask image in a correlated location to the first portion on the wagering game video image;

splitting the first data stream into a second data stream containing video data for the first portion, and a third data stream containing video data for the mask image, and video data for a second portion of the wagering game video image, wherein the second portion is different from the first portion;

presenting, on a first display, the first portion; and presenting, on a second display, the mask image on the correlated location to the first portion on the first display, and the second portion.

2. The method of claim 1, wherein the second data stream includes data only for the first portion and the third data stream includes data only for the mask image and the second portion.

3. The method of claim 1, wherein the second display is positioned in front of the first display and wherein the mask image is a transparent mask that, when presented on the second display, is aligned with the first portion on the first display along a viewing axis so that the first portion can be seen through the transparent mask.

4. The method of claim 1, wherein presentation of the first portion on the first display includes presentation of at least one dynamically changing pixel for the first portion at a first location of the first display, which dynamically changing pixel changes appearance according to movement displayed for the first portion of the wagering game video image, and wherein presentation of the mask image on the second display includes presentation of at least one static pixel at a second location on the second display that corresponds to the first location of the first display for the dynamically changing pixel.

5. The method of claim 1, wherein the mask image is one or more of a buffered image, an opaque image, and a transparent image.

6. One or more tangible machine-readable storage media having instructions stored thereon, which when executed by a set of one or more processors causes the set of one or more processors to perform operations comprising:

receiving a first video stream of a wagering game video image, wherein the wagering game video image includes one or more first video images at one or more first locations and one or more second video images at one or more second locations;

generating from the first video stream a second video stream including the one or more first video images, and a third video stream including the one or more second video images at the one or more second locations, and one or more transparent portions that correlate to the one or more first locations for the one or more first video images;

providing the second video stream to a first display;

for presentation of the one or more first video images on the first display, wherein the first display is behind a second display;

providing the third video stream to the second display;

for presentation of the one or more second video images and the one or more transparent portions on the second display, wherein presentation of the one or more transparent portions align with presentation of the one or more first video images presented via the first display to be viewable through the second display.

7. The one or more tangible machine-readable storage media of claim 6, wherein the one or more first video images include images that present wagering game results and wherein the one or more second video images include thematic and branding graphics.

8. The one or more tangible machine-readable storage media of claim 6, said operations further comprising:

determining the one or more first locations of the one or more first video images within the wagering game video image;

including within the second video stream the one or more first video images according to the one or more first locations;

determining the one or more second locations of the one or more second video images within the wagering game video image;

including within the third video stream the one or more second video images according to the one or more second locations; and including within the third video stream the one or more transparent portions according to the one or more first locations.

9. The one or more tangible machine-readable storage media of claim 6, wherein the operations for generating the second video stream comprises:

determining first coordinates for the one or more first video images on the wagering game video image; and replacing data at second coordinates of the third video stream with transparent display data, wherein the second coordinates correspond to the first coordinates.

10. The one or more tangible machine-readable storage media of claim 6, said operations further comprising presenting an overlay image on the second display that appears contiguously over the one or more first video images and the one or more second video images.

11. The one or more tangible machine-readable storage media of claim 10, wherein said operation for presenting the overlay image includes operations further comprising:

buffering a static image of the one or more first video images;

presenting the static image of the one or more first video images on the second display in place of the one or more transparent portions; and presenting a pay line on the second display so that the pay line covers at least some portion of the one or more second video images and at least some portion of the static image of the one or more first video images.

12. A system, comprising:

a wagering game processor configured to generate a first video data stream containing a wagering game video image;

a first display and second display configured to display portions of the wagering game video image; and a video controller configured to receive the first video data stream, split the first video data stream into a second video data stream containing data for a first portion of the wagering game video image, and a third video data stream containing data for a second portion of the wagering game video image, generate a mask image, include the mask image in the third video data stream at one or more locations that correspond to the first portion of the wagering game video image, present, on the first display, the first portion of the wagering game video image, present, on the second display, the mask image on a correlated location to the first portion on the first display, and present, on the second display, the second portion of the wagering game video image.

13. The system of claim 12, wherein the second display is positioned in front of the first display and aligned so that the first portion of the wagering game video image, as presented on the first display, appears aligned with the mask image along a viewing axis.

14. The system of claim 12, wherein the first portion of the wagering game video image includes at least one dynamically changing pixel that changes appearance according to movement of content within the first portion of the wagering game video image, and wherein the mask image includes at least one static pixel that corresponds to the same location as the at least one dynamically changing pixel.

15. The system of claim 12, wherein the video controller is further configured to store first pixel coordinates and first visual characteristics for one or more wagering game play objects from the first portion of the wagering game video image in the second video stream, store second pixel coordinates and second visual characteristics for one or more animated objects from the wagering game video image in the third video stream, present the one or more wagering game play objects only on the first display according to the first pixel coordinates, and present the one or more animated objects only on the second display according to the second pixel coordinates.

16. The system of claim 12, wherein the mask image is one or more of a buffered image, an opaque colored image, and a transparent image.

17. The system of claim 12, wherein the first display includes a projector configured to project the first portion of the wagering game video image on one or more projector screens.

18. The system of claim 12, further comprising:

a mask coordinates store configured to store coordinates for where the first portion of the wagering game video image is located within the wagering game video image.

19. The system of claim 12, further comprising:

an account server configured to provide player account information to display on one or more of the first display and the second display; and a wagering game server configured to provide wagering game content, wherein the wagering game processor is configured to generate the wagering game video image from the wagering game content.

20. A wagering game machine, comprising:

a wagering game processor configured to generate a first video stream including a wagering game video image of wagering game content; and a video controller configured to split the first video stream into a plurality of output video streams, and determine to which of the plurality of output video streams to send input pixels from the first video stream via use of a mask template as a reference, being configured to select one of the input pixels from the first video stream, wherein the first video stream has a given video resolution, compare the one of the input pixels to a corresponding template pixel from the mask template, wherein the mask template has a same video resolution as the first video stream and the template pixel is in a same location on the mask template as the one of the input pixels is on the wagering game video image according to the video resolution, determine a value associated with the template pixel, wherein the value indicates an assignment to one of the plurality of output video streams, wherein the plurality of output video streams have the same video resolution as the first video stream, and send the one of the input pixels to the one of the plurality of output video streams indicated by the value.

21. The wagering game machine of claim 20, wherein the video controller is further configured to send a static pixel image to all others of the plurality of output video streams which did not receive the input pixel;

send the input pixel to a rear display that is overlapping and aligned behind a front display, wherein the rear display is configured to display the input pixel as a live video pixel image on the rear display, and send the static pixel image to the front display, wherein the front display is see-through in a portion in front of the live video pixel image, and wherein the static pixel image is transparent so that the live video pixel image can be seen through the portion of the front display.

22. The wagering game machine of claim 21, wherein the wagering game processor is further configured to provide a display mode for the wagering game machine that temporarily sends the input pixel to the front display in place of the static pixel image.

23. An apparatus, comprising:

means for receiving a first video stream of a wagering game image, wherein the first video stream has a given video resolution and pixel change rate;

means for reading a mask template file that indicates a plurality of portions of the wagering game image, wherein the mask template file is the same video resolution as the first video stream so that individual pixels in the first video stream correlate to individual mask template pixels in the mask template file;

means for generating a second video stream using a mask template file as a reference, said second video stream including video of a first portion of the wagering game image, wherein the second video stream has the same video resolution and the same pixel change rate as the first video stream; and means for generating a third video stream using the mask template file as a reference, wherein the third video stream includes a second portion of the wagering game image wherein the third video stream has the same video resolution and the same pixel change rate as the first video stream, and one or more transparent masks that correlate to the location of the first portion of the wagering game image.

24. The apparatus of claim 23 further comprising:

means for presenting the first portion of the wagering game image on a first display, wherein the first display is behind a second display, and wherein the second display has see-through portions so that the first portion of the wagering game image is viewable through the second display; and means for presenting the second portion of the wagering game image and the one or more transparent masks in the third video stream on the second display so that the one or more transparent masks align with the first portion of the wagering game image on the first display along a viewing axis so that the first portion of the wagering game image is viewable through the second display.

25. The apparatus of claim 23 further comprising:

means for comparing the wagering game image to the mask template;

means for determining that a location of a first pixel within the first portion of the wagering game image is associated with a location of a first mask template pixel within the mask template file based on the means for comparing the wagering game image to the mask template;

means for determining that the first mask template pixel assigned to a first value assigned to the second video stream;

means for sending the first pixel to the second video stream based on the means for determining that the first mask template pixel is assigned to the first value assigned to the second video stream;

means for determining that a location of a second pixel within the second portion of the wagering game image is associated with a location of a second mask template pixel within the mask template file based on the means for comparing the wagering game image to the mask template;

means for determining that the second mask template pixel assigned to a second value assigned to the third video stream, wherein the second value is different from the first value; and means for sending the second pixel to the third video stream based on the means for determining that the second mask template pixel is assigned to the second value assigned to the third video stream.

* * * * *